(12) United States Patent
Sun et al.

(10) Patent No.: US 10,263,818 B2
(45) Date of Patent: Apr. 16, 2019

(54) INTEGRITY CHECK TECHNIQUES FOR MULTI-CHANNEL ACTIVITY DETECTION

(71) Applicant: QUALCOMM Incorporated, San Diego, CA (US)

(72) Inventors: Jing Sun, San Diego, CA (US); Taesang Yoo, Riverside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 15/211,162

(22) Filed: Jul. 15, 2016

(65) Prior Publication Data

US 2017/0086222 A1   Mar. 23, 2017

Related U.S. Application Data

(60) Provisional application No. 62/220,789, filed on Sep. 18, 2015.

(51) Int. Cl.
*H04W 74/00* (2009.01)
*H04L 27/20* (2006.01)
(Continued)

(52) U.S. Cl.
CPC .......... *H04L 27/2067* (2013.01); *H04L 5/001* (2013.01); *H04L 27/0006* (2013.01); *H04L 43/0811* (2013.01); *H04W 24/08* (2013.01); *H04W 24/10* (2013.01); *H04W 72/00* (2013.01); *H04W 74/08* (2013.01); *H04L 5/0048* (2013.01)

(58) Field of Classification Search
None
See application file for complete search history.

(56) References Cited

U.S. PATENT DOCUMENTS 3,961,266 A   6/1976   Tanaka
5,077,828 A   12/1991  Waldroup
(Continued)

FOREIGN PATENT DOCUMENTS

WO   WO-2014126519 A1   8/2014

OTHER PUBLICATIONS

ISA/EP, International Search Report and Written Opinion of the International Searching Authority, Int'l Application No. PCT/US2016/047191, dated Oct. 26, 2016, European Patent Office, Rijswijk, NL, 13 pgs.

*Primary Examiner* — Kenny S Lin
(74) *Attorney, Agent, or Firm* — Holland & Hart LLP

(57) ABSTRACT

Methods, systems, and devices for wireless communication are described. In some wireless communications systems, a wireless device may identify a set of at least two wireless communications channels that are available for communication with another wireless device. In some examples, the wireless device may identify at least one channel of the set, and may select integrity check information that indicates the identified wireless channel(s) that are available. The wireless device may then transmit the integrity check information during a first time period. In some examples, a wireless device may receive wireless communication that includes integrity check information on a subset of channels. The wireless device may then determine, based on the integrity check information, whether the identified subset of channels is the same as the actual subset of channels used for transmission of the wireless communications.

30 Claims, 17 Drawing Sheets

(51) Int. Cl.
*H04L 12/26* (2006.01)
*H04W 24/08* (2009.01)
*H04W 24/10* (2009.01)
*H04W 74/08* (2009.01)
*H04W 72/00* (2009.01)
*H04L 5/00* (2006.01)
*H04L 27/00* (2006.01)

(56) References Cited

U.S. PATENT DOCUMENTS

| | | | | |
|---|---|---|---|---|
| 5,623,934 | A * | 4/1997 | Midorikawa | A61N 1/08 128/903 |
| 6,131,176 | A * | 10/2000 | Sefidvash | G06F 11/10 714/48 |
| 6,543,022 | B1 * | 4/2003 | O'Connor | H03M 13/03 380/46 |
| 6,760,837 | B1 * | 7/2004 | Laurenti | G06F 5/01 712/300 |
| 9,621,262 | B1 * | 4/2017 | Timmins | H04B 10/0791 |
| 2006/0009231 | A1 * | 1/2006 | Emami | H04B 17/309 455/452.2 |
| 2008/0002567 | A1 * | 1/2008 | Bourlas | H04L 1/0046 370/208 |
| 2010/0097952 | A1 * | 4/2010 | McHenry | H04L 27/0006 370/252 |
| 2011/0280335 | A1 | 11/2011 | Tu et al. | |
| 2013/0225157 | A1 * | 8/2013 | Sikri | H04W 24/04 455/423 |
| 2013/0288741 | A1 * | 10/2013 | Sjadieh | H04W 76/15 455/552.1 |
| 2014/0036850 | A1 * | 2/2014 | Akimoto | H04L 5/0017 370/329 |
| 2015/0029886 | A1 * | 1/2015 | Seo | H04J 11/005 370/252 |

* cited by examiner

INTEGRITY CHECK TECHNIQUES FOR MULTI-CHANNEL ACTIVITY DETECTION

CROSS REFERENCES

The present application for patent claims priority to U.S. Provisional Patent Application No. 62/220,789 by Sun et al., entitled "Integrity Check Techniques for Multi-Channel Activity Detection," filed Sep. 18, 2015, assigned to the assignee hereof.

BACKGROUND

The following relates generally to wireless communication, and more specifically to integrity check techniques for reliable multi-channel activity detection.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple access systems include code division multiple access (CDMA) systems, time division multiple access (TDMA) systems, frequency division multiple access (FDMA) systems, and orthogonal frequency division multiple access (OFDMA) systems. A wireless multiple access communications system may include a number of base stations, each simultaneously supporting communication for multiple communication devices, which may be otherwise known as user equipment (UE).

In some wireless systems, a transmission containing communications data may be sent across multiple channels (e.g., four 20 MHz sub-channels of an 80 MHz total channel bandwidth) within a radio frequency spectrum band. In some cases, the radio frequency spectrum band may be a shared radio frequency spectrum band (e.g., an unlicensed band). In instances where communications are transmitted on multiple channels, but one or more of those channels are jammed by another device, a receiving wireless device may receive communications on different channels than were used by the transmitting wireless device to transmit the communications. This may result in an inefficient use of resources at the receiving wireless device when attempting to decode the transmission under the assumption that different channels were used for the transmission than were actually used for the transmission.

SUMMARY

In some wireless communications systems, a wireless device may identify a set of wireless communications channels that are available for communication with another wireless device. The wireless device may identify at least one channel of the set of wireless communications channels for transmissions during an identified time period, and may select integrity check information that indicates the identified wireless channel(s) of the set used for transmission during the identified time period. The wireless device may then transmit the integrity check information during the identified time period using each identified wireless channel used for transmissions during the identified time period. The locations of the integrity check information within the transmissions on each channel, according to some examples, may be determined based on the particular subset of wireless channels used for wireless transmissions during the identified time period.

In some examples, a receiving wireless device may detect which channels are used for a wireless communication, and receive wireless communication that includes integrity check information transmitted using each channel of the detected channels. The wireless device may then determine, based on the integrity check information, whether the detected channels are likely the same as the actual subset of channels used for transmission of the wireless communications. If the detected channels are unlikely to be the same as the actual subset of channels used for the transmission, the wireless device may identify one or more other candidate subsets of channels that may potentially have been used for the transmission, and determine based on integrity check information associated with each different candidate subset whether one of the candidate subsets was likely the actual subset of channels used for the transmission during the identified time period.

A method of wireless communication is described. The method may include identifying a set of two or more available wireless communications channels for transmitting wireless communications, identifying at least one wireless communications channel of the set of available wireless communications channels that is available for transmission during a first time period, selecting integrity check information that indicates the identified at least one wireless communications channel available for transmission during the first time period and transmitting the integrity check information in the identified at least one wireless communications channel during the first time period.

An apparatus for wireless communication is described. The apparatus may include means for identifying a set of two or more available wireless communications channels for transmitting wireless communications, means for identifying at least one wireless communications channel of the set of available wireless communications channels that is available for transmission during a first time period, means for selecting integrity check information that indicates the identified at least one wireless communications channel available for transmission during the first time period and means for transmitting the integrity check information in the identified at least one wireless communications channel during the first time period.

A further apparatus is described. The apparatus may include a processor, memory in electronic communication with the processor, and instructions stored in the memory. The instructions may be operable to cause the processor to identify a set of two or more available wireless communications channels for transmitting wireless communications, identify at least one wireless communications channel of the set of available wireless communications channels that is available for transmission during a first time period, select integrity check information that indicates the identified at least one wireless communications channel available for transmission during the first time period and transmit the integrity check information in the identified at least one wireless communications channel during the first time period.

A non-transitory computer readable medium for wireless communication is described. The non-transitory computer-readable medium may include instructions to cause a processor to identify a set of two or more available wireless communications channels for transmitting wireless communications, identify at least one wireless communications channel of the set of available wireless communications channels that is available for transmission during a first time period, select integrity check information that indicates the identified at least one wireless communications channel available for transmission during the first time period and transmit the integrity check information in the identified at least one wireless communications channel during the first time period.

Some examples of the method, apparatus, or non-transitory computer-readable medium described above may further include processes, features, means, or instructions for determining locations of the integrity check information within the transmissions on each of the wireless communications channels based on which wireless communications channels of the set of available wireless communications channels are used to transmit the wireless communications. In some examples of the method, apparatus, or non-transitory computer-readable medium described above, the integrity check information comprises a known bit sequence uniformly hashed to resource element (RE)s at the determined locations.

Some examples of the method, apparatus, and non-transitory computer-readable medium described above may further include processes, features, means, or instructions for determining a scrambling sequence for the integrity check information based at least in part on which wireless communications channels of the set of available wireless communications channels may be used to transmit the wireless communications.

In some examples of the method, apparatus, or non-transitory computer-readable medium described above, a bit pattern of the integrity check information is determined based on which wireless communications channels of the set of available wireless communications channels are used to transmit the wireless communications.

Some examples of the method, apparatus, or non-transitory computer-readable medium described above may further include processes, features, means, or instructions for transmitting a reference signal (RS) using each of the identified wireless communications channels. In some examples of the method, apparatus, or non-transitory computer-readable medium described above, the integrity check information is transmitted after the RS in each of the identified wireless communications channels.

In some examples of the method, apparatus, and non-transitory computer-readable medium described above, the integrity check information may be transmitted after the RS in each of the at least one wireless communications channel of the set of available wireless communications channels that may be available for transmission during the first time period.

In some examples of the method, apparatus, or non-transitory computer-readable medium described above, the method is performed by a base station and the integrity check information is transmitted by the base station using a layer one (L1) channel such as a physical frame format indicator channel (PFFICH).

In some examples of the method, apparatus, or non-transitory computer-readable medium described above, the set of available wireless communications channels comprise wireless communications channels in a shared radio frequency spectrum band, and the identifying the wireless communications channels available for transmission during the first time period comprises: performing a listen-before-talk (LBT) procedure on each wireless communications channel of the set of available wireless communications channels to determine availability of each channel for transmissions during the first time period. Some examples of the method, apparatus, or non-transitory computer-readable medium described above may further include processes, features, means, or instructions for identifying, based on the LBT procedure, the at least one wireless communications channel as a channel of the set of available wireless communications channels that is available for transmissions based on the LBT procedure.

In some examples of the method, apparatus, or non-transitory computer-readable medium described above, the method is performed by a user equipment (UE) and the integrity check information is transmitted by the UE using a L1 channel. In some examples of the method, apparatus, or non-transitory computer-readable medium described above, the integrity check information comprises a UE-specific RE quadrature phase shift keying (QPSK) sequence.

In some examples of the method, apparatus, or non-transitory computer-readable medium described above, the set of available wireless communications channels is received in an uplink (UL) grant from a base station and comprise wireless communications channels in a shared radio frequency spectrum band, and where the identifying the wireless communications channels available for transmission during the first time period comprises: performing an LBT procedure on each wireless communications channel of the set of available wireless communications channels to determine availability of each channel for transmissions during the first time period. Some examples of the method, apparatus, or non-transitory computer-readable medium described above may further include processes, features, means, or instructions for identifying, based on the LBT procedure, the at least one wireless communications channels a channel of the set of available wireless communications channels that is available for transmissions based on the LBT procedure.

A method of wireless communication is described. The method may include identifying a subset of wireless communications channels of a set of available wireless communications channels that contain wireless transmissions during a first time period, receiving wireless communications over the subset of wireless communications channels, determining integrity check information in the wireless communications channels of the subset of wireless communications channels and determining, based at least in part on the integrity check information, whether the identified subset of wireless communications channels is the same as an actual subset of wireless communications channels used for transmission of the wireless communications during the first time period.

An apparatus for wireless communication is described. The apparatus may include means for identifying a subset of wireless communications channels of a set of available wireless communications channels that contain wireless transmissions during a first time period, means for receiving wireless communications over the subset of wireless communications channels, means for determining integrity check information in the wireless communications channels of the subset of wireless communications channels and means for determining, based at least in part on the integrity check information, whether the identified subset of wireless communications channels is the same as an actual subset of wireless communications channels used for transmission of the wireless communications during the first time period.

A further apparatus is described. The apparatus may include a processor, memory in electronic communication with the processor, and instructions stored in the memory. The instructions may be operable to cause the processor to identify a subset of wireless communications channels of a set of available wireless communications channels that contain wireless transmissions during a first time period, receive wireless communications over the subset of wireless communications channels, determine integrity check information in the wireless communications channels of the subset of wireless communications channels and determine, based at least in part on the integrity check information, whether the identified subset of wireless communications channels is the same as an actual subset of wireless communications channels used for transmission of the wireless communications during the first time period.

A non-transitory computer readable medium for wireless communication is described. The non-transitory computer-readable medium may include instructions to cause a processor to identify a subset of wireless communications channels of a set of available wireless communications channels that contain wireless transmissions during a first time period, receive wireless communications over the subset of wireless communications channels, determine integrity check information in the wireless communications channels of the subset of wireless communications channels and determine, based on the integrity check information, whether the identified subset of wireless communications channels is the same as an actual subset of wireless communications channels used for transmission of the wireless communications during the first time period.

Some examples of the method, apparatus, or non-transitory computer-readable medium described above may further include processes, features, means, or instructions for determining, based on the integrity check information, whether one or more other subsets of wireless communications channels can potentially be the actual subset of wireless communications channels used for transmission of the wireless communications during the first time period.

In some examples of the method, apparatus, or non-transitory computer-readable medium described above, when it is determined that the identified subset of wireless communications channels is not the same as an actual subset of wireless communications channels used for transmission of the wireless communications during the first time period, the method further comprises: identifying one or more candidate subsets of wireless communications channels that are different than the identified subset of wireless communications channels. Some examples of the method, apparatus, or non-transitory computer-readable medium described above may further include processes, features, means, or instructions for determining that a first candidate subset of the one or more candidate subsets was used for transmission of the wireless communications during the first time period. Some examples of the method, apparatus, or non-transitory computer-readable medium described above may further include processes, features, means, or instructions for decoding at least a portion of the wireless communications based on the first candidate sub set.

In some examples of the method, apparatus, or non-transitory computer-readable medium described above, the identifying one or more candidate subsets comprises: determining that another transmitter is transmitting using a first wireless communications channel of the set of available wireless communications channels, and identifying a first candidate subset that includes the subset of wireless communications channels and the first wireless communications channel.

Some examples of the method, apparatus, and non-transitory computer-readable medium described above may further include processes, features, means, or instructions for receiving a RS on each of the wireless communications channels of the subset of wireless communications channels, wherein the first candidate set may be determined based at least in part on the RS.

In some examples of the method, apparatus, or non-transitory computer-readable medium described above, the identifying the subset of wireless communications channels comprises measuring an energy level of each wireless communications channel of the set of wireless communications channels, and identifying the subset of wireless communications channels as each channel of the set of wireless communications channels having an energy level that exceeds a threshold.

In some examples of the method, apparatus, or non-transitory computer-readable medium described above, the identifying one or more candidate subsets comprises: determining that the measured energy level for a first wireless communications channel of the set of available wireless communications channels is within a predefined range from the threshold, and identifying a first candidate subset that includes the subset of wireless communications channels and the first wireless communications channel.

In some examples of the method, apparatus, or non-transitory computer-readable medium described above, the determining comprises: determining locations of the integrity check information within the transmissions on each wireless communications channel of the subset of wireless communications channels based on which wireless communications channels of the set of available wireless communications channels are included in the subset of wireless communications channels. Some examples of the method, apparatus, or non-transitory computer-readable medium described above may further include processes, features, means, or instructions for determining a log-likelihood ratio (LLR) for each of the locations of the integrity check information, descrambling the LLRs using a predetermined bit sequence associated with the subset of wireless communications channels, and computing a soft metric based on a correlation between the descrambled LLRs and the predetermined bit sequence associated with the subset of wireless communications channels. Some examples of the method, apparatus, or non-transitory computer-readable medium described above may further include processes, features, means, or instructions for determining that another subset of the set of available wireless communications channels other than the identified subset may potentially be used for transmission of the wireless communications during the first time period when the soft metric is below a threshold. Some examples of the method, apparatus, or non-transitory computer-readable medium described above may further include processes, features, means, or instructions for determining that the channels of the identified subset of wireless communications channels used for transmission of the wireless communications during the first time period when the soft metric is above the threshold.

In some examples of the method, apparatus, or non-transitory computer-readable medium described above, the integrity check information comprises a predetermined bit sequence uniformly hashed to REs at the determined locations, and where the determined locations are determined based on which wireless communications channels of the set of available wireless communications channels are used to transmit the wireless communications.

In some examples of the method, apparatus, or non-transitory computer-readable medium described above, the identifying the subset of wireless communications channels comprises: receiving a RS on each of the wireless communications channels of the subset of wireless communications channels. In some examples of the method, apparatus, or non-transitory computer-readable medium described above, the integrity check information is transmitted after the RS on each of the wireless communications channels of the subset of wireless communications channels.

In some examples of the method, apparatus, and non-transitory computer-readable medium described above, the integrity check information may be transmitted after the RS on each of the wireless communications channels of the subset of wireless communications channels.

In some examples of the method, apparatus, or non-transitory computer-readable medium described above, the method is performed by a UE and the integrity check information is transmitted by a base station using a L1 channel. In some examples of the method, apparatus, or non-transitory computer-readable medium described above, the L1 channel is a PFFICH.

In some examples of the method, apparatus, or non-transitory computer-readable medium described above, the method is performed by a base station and the integrity check information is transmitted by a UE using a L1 channel. In some examples of the method, apparatus, or non-transitory computer-readable medium described above, the integrity check information comprises a UE-specific RE QPSK sequence.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Figure 1:
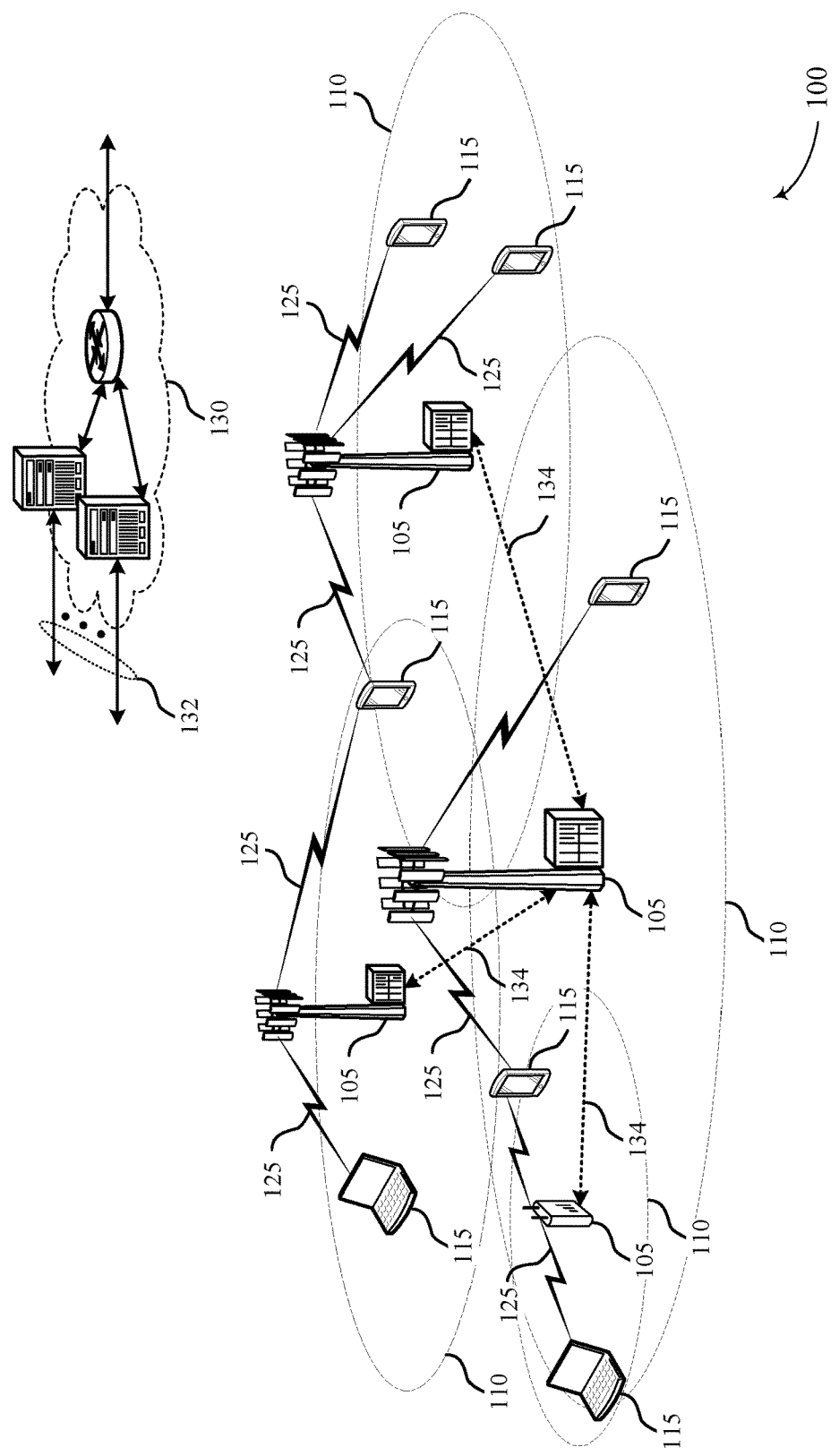
FIG. 1 illustrates an example of a wireless communications system that supports integrity check techniques for reliable multi-channel activity detection in accordance with aspects of the present disclosure.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

DETAILED DESCRIPTION

Techniques are described in which a shared radio frequency spectrum band is used for at least a portion of communications over a wireless communications system. In some cases, when using a shared radio frequency spectrum band, a receiving device may detect transmissions on certain channels, such as a subset of 20 MHz sub-channels in an 80 MHz channel bandwidth, that contain wireless communication transmissions. The detected channels may in some situations be different than the actual channels used by a transmitter when transmitting the wireless communications (e.g., due to interference from a jamming device in proximity to the receiving device).

According to aspects of the present disclosure, integrity check information may be included with a transmission, which may be used by a receiving device to confirm that the detected channel activity corresponds to the channels used by the transmitting device for a particular time period. In some examples, a wireless device may identify a set of wireless communications channels that are available for communication with another wireless device (e.g., four 20 MHz channels of an 80 MHz channel bandwidth). The wireless device may identify at least one channel of the set of wireless communications channels for transmissions during an identified time period (e.g., three of the four 20 MHz channels). The wireless device may then select integrity check information that indicates the identified wireless channel(s) of the set used for transmission during the identified time period and transmit the integrity check information during the identified time period using each identified wireless channel used for transmissions during the identified time period. The locations of the integrity check information within the transmissions on each channel, according to some examples, may be determined based on the particular subset of wireless channels used for wireless transmissions during the identified time period (e.g., integrity check information for channels 0/1/2 is mapped to a different location than integrity check information for channels 0/1/3).

A receiving wireless device may use the integrity check information to confirm proper detection of received wireless communications channels. For example, a receiving device may detect which channels are used for a wireless communication, and receive wireless communication that includes integrity check information transmitted using each channel of the detected channels. The wireless device may then determine, based on the integrity check information, whether the detected channels are likely the same as the actual subset of channels used for transmission of the wireless communications. If the detected channels are unlikely to be the same as the actual subset of channels used for the transmission, the wireless device may, in some examples, identify one or more other candidate subsets of channels that may potentially have been used for the transmission, and determine based on integrity check information associated with each different candidate subset whether one of the candidate subsets was likely the actual subset of channels used for the transmission during the identified time period.

Aspects of the disclosure are initially described in the context of a wireless communications system. Specific examples are then described for multi-channel communication and the inclusion of an integrity check information within channels. Aspects of the disclosure are further illustrated by and described with reference to apparatus diagrams, system diagrams, and flowcharts that relate to integrity check techniques for reliable multi-channel activity detection.

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-Advanced (LTE-A) network. Wireless communications system 100 may support communications with an integrity check channel used over multi-channel communications.

In some examples, wireless communications system 100 may operate in shared or unlicensed spectrum, such that base stations 105 and UEs 115 perform listen-before-talk (LBT) procedures prior to transmitting on at least one wireless channel. In some examples, wireless communications system 100 may use enhanced component carriers (eCCs) in which radio frequency channels (i.e., frequency bands) used for downlink (DL) and/or uplink (UL) transmissions may include multiple sub-channels (e.g., an 80 MHz transmission bandwidth composed of four 20 MHz channels), in which communications may span across the multiple channels. An LBT procedure may be used for each different channel and then a wireless communication may be transmitted using one or more channels that passed the LBT procedure. In some examples, an integrity check process may be used for channel activity detection procedures in order to provide receivers with information that may be used to confirm which particular sub-channels were likely used for a wireless transmission, as will be discussed in more detail below.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile.

A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communications system 100 may use a frame structure may be used to organize physical resources. A frame may be a 10 ms interval that may be further divided into 10 equally sized sub-frames. Each sub-frame may include two consecutive time slots. Each slot may include 6 or 7 OFDMA symbol periods. A resource element consists of one symbol period and one subcarrier (a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a cell specific reference signal (CRS) and a UE-specific reference signal (UE-RS). UE-RS, or a demodulation reference signal (DM-RS) may be transmitted on the resource blocks associated with PDSCH. The number of bits carried by each resource element may depend on the modulation scheme (the configuration of symbols that may be selected during each symbol period). Thus, the more resource blocks that a UE receives and the higher the modulation scheme, the higher the data rate may be for the UE.

A carrier, which may also be referred to as a component carrier (CC), a layer, a channel, etc., may be a relatively narrow-bandwidth carrier susceptible of being utilized independently or in combination with other carriers (e.g., other component carriers). Each component carrier may provide the same capabilities as an isolated carrier based on release 8 or release 9 of the LTE standard. Multiple component carriers may be aggregated or utilized concurrently to provide some UEs 115 with greater bandwidth and, e.g., higher data rates, according to carrier aggregation (CA) techniques. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc.

In some examples, wireless communications system 100 may utilize one or more eCCs. An eCC may be characterized by one or more features including: flexible bandwidth, variable length TTIs, and modified control channel configuration. In some cases, an eCC may be associated with a carrier aggregation configuration or a dual connectivity configuration (i.e., when multiple serving cells have a sub-optimal backhaul link). An eCC may also be configured for use in unlicensed spectrum or a shared radio frequency spectrum band (where more than one operator may use the same spectrum). An eCC characterized by flexible bandwidth may include one or more segments that may be utilized by UEs 115 that do are not capable of monitoring the whole bandwidth or prefer to use a limited bandwidth (e.g., to conserve power).

In some examples that may use a shared radio frequency spectrum band, the channels used in an eCC transmission, even though an LBT procedure may have cleared, may be subject to interference and/or communication traffic from other sources or wireless devices. For example, three 20 MHz channels may clear an LBT procedure at a transmitting device, which may then initiate transmissions using the three cleared channels. However, another device that may be in proximity to a receiving wireless device may start transmitting using a first channel of the cleared channels which may result in the receiving device not detecting communications on the first channel. As a result, a receiver (e.g., a UE 115) that receives such communications may assume that transmissions were made using a different set of channels than were actually used for the transmission. The receiver may then attempt to receive and decode the communications according to this incorrect assumption, which may result in unsuccessful reception and potentially generate errors that may be propagated into future transmissions.

According to some aspects of the disclosure, an integrity check process may be used for channel activity detection in order to reduce communication errors associated with such scenarios. In some examples, transmissions may include a layer one (L1) protocol integrity check logical channel that may be transmitted in each frequency channel used in a wireless communications transmission. A receiving device (e.g., a base station 105 or UE 115) may verify detected channel activity with actual channel activity for a transmission during a particular time period based on the integrity check information.

Figure 2:
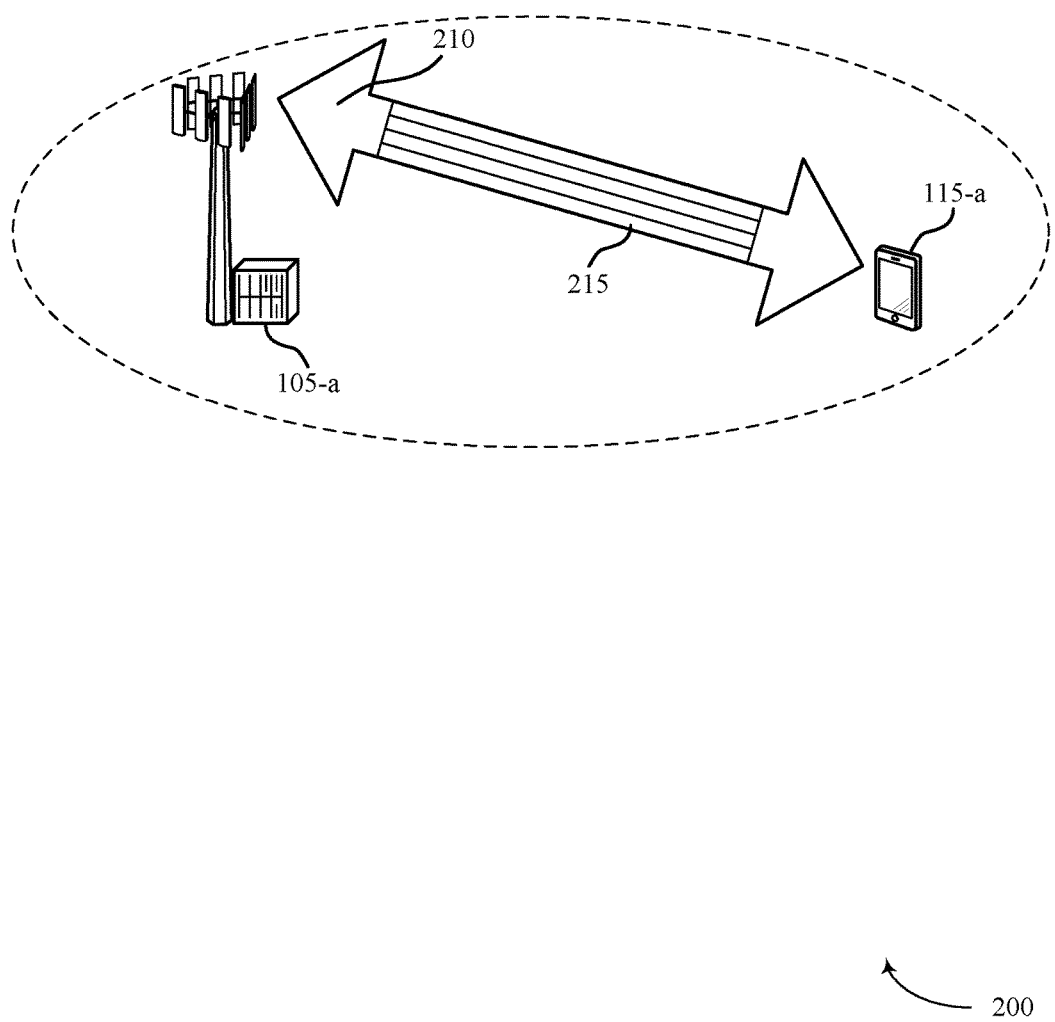
FIG. 2 illustrates an example of a wireless communications system that supports integrity check techniques for reliable multi-channel activity detection in accordance with aspects of the present disclosure.

FIG. 2 illustrates an example of a wireless communications system 200 that may use integrity check techniques for reliable multi-channel activity detection. Wireless communications system 200 may include base station 105-a and UE 115-a, which may be examples of the corresponding devices described with reference to FIG. 1. Wireless communications system 200 may support the inclusion of integrity check information within UL and DL communications for efficient channel activity detection.

Wireless communications system 200 may use eCCs to improve throughput, latency, or reliability of wireless communications. In a system supporting eCC operation, as mentioned above, the communications may use a transmission bandwidth (also referred to as frequency bands) for both DL and UL transmissions 210. The transmission bandwidth may include multiple frequency channels 215 (also referred to as sub-bands or sub-channels). For example, DL and UL transmissions 210 may use an 80 MHz transmission bandwidth composed of four 20 MHz channels 215. Each of the channels 215 used for UL and DL transmissions 210 may also be subject to communication traffic from other wireless devices. An LBT procedure, such as a clear channel assessment (CCA), may indicate whether channels 215 are available for communication for a UE 115-a or base station 105-a. Because the channels 215 of a multi-channel transmission 210 may be used jointly to improve efficiency and reduce complexity, reliable channel activity detection (i.e., detecting which sub-channels are used for a transmission) may enable more efficient wireless communication.

In some cases, the channels 215 used in an eCC transmission, even though having cleared an LBT procedure at the transmitting device (e.g., base station 105-a may clear CCA on each channel 215 prior to transmitting), may be subject to interference and/or communication traffic from other sources or wireless devices. As a result, a receiver (e.g., UE 115-a) that receives such communications may assume that transmissions were made using a different set of channels 215 than were actually used for the transmission. The receiver may then attempt to receive and decode the communications according to this incorrect assumption, which may result in unsuccessful reception and may potentially generate errors in a feedback process (e.g., a hybrid automatic repeat request (HARD) process) that may be propagated to future transmissions.

In some cases, the channel activity detection step used by a receiver may be completed per channel 215, through detection of a preamble transmitted in each channel 215 by the transmitter. The preamble may be a known sequence, but in some instances may not contain information related to the activity of other channels 215. Thus, detection of a preamble on certain channels may not provide information on which particular channels 215 are used for transmissions during a particular time period. For example, a receiver may detect a preamble on two of four available channels 215, and may determine that the detected two channels are used for an eCC transmission. However, as discussed above, in the event that another device starts transmitting on a third channel, this may prevent the receiver from receiving the preamble that was transmitted on the third channel, and the receiver determination that communications were transmitted using the detected two channels will be a mistake. Various aspects provide techniques for verifying channel activity to help reduce or eliminate such occurrences.

Figure 3:
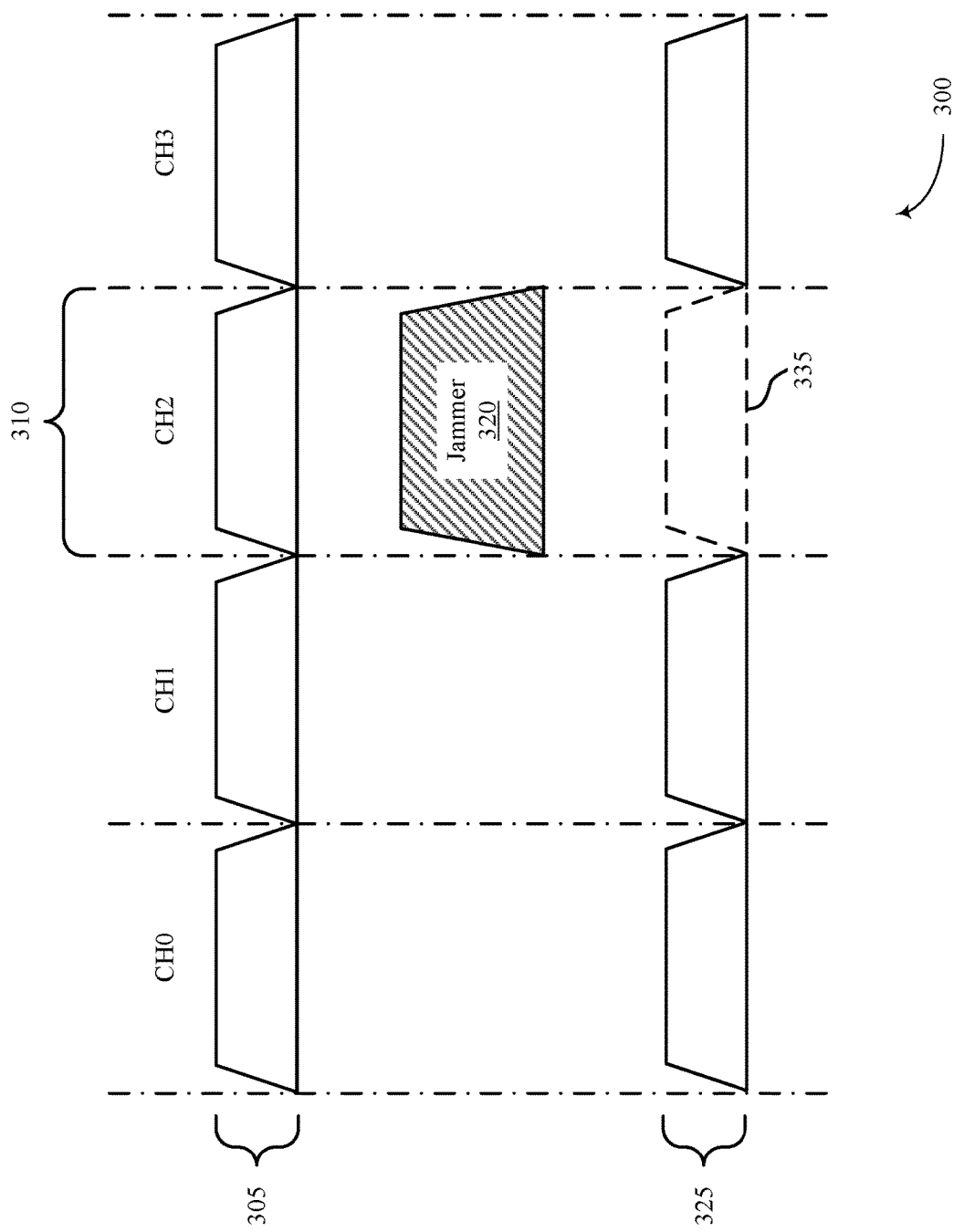
FIGS. 3-5 illustrate examples of multi-channel communications that support integrity check techniques for reliable multi-channel activity detection in accordance with aspects of the present disclosure.

FIG. 3 illustrates an example of multi-channel communication 300 in which a jamming device may impact channel detection. In some cases, multi-channel communication 300 may represent aspects of techniques performed by a UE 115 or base station 105 as described with reference to FIGS. 1-2. FIG. 3 represents an example of a detection error in communication over multiple channels, where an integrity check channel may be used to identify such a detection error.

In the example of FIG. 3, a wireless system may communicate using DL and UL transmissions over multiple sub-channels. For example, a transmission 305 may be sent using an 80 MHz bandwidth that is composed of four 20 MHz channels, such as channel 310. In some cases, each channel 310 may have independent control information, such as a preamble that is specific to that channel. When sending the transmission 305, a wireless device may use all four channels 310 that have been determined to be available for communication (e.g., CH0, CH1, CH2, and CH3), through an LBT procedure for example.

In this example, nearby high energy interference in the form of a jammer 320 may prevent a receiver from detecting the preamble for the communication transmitted in CH2. As a result of the jammer 320, the receiver may only receive the preambles 325 for the remaining channels, and may incorrectly assume that only CH0, CH1, and CH3 were initially used for communication, as a preamble 335 for CH2 is not received.

To improve the reliability of multi-channel communications and channel activity detection, various examples provide an L1 protocol integrity check technique that may be used to identify misdetections of channel activity. Such techniques may be used to identify misdetection of channel activity, and a receiver in some examples may simply ignore the transmissions for the time period associated with the misdetection. Thus, such techniques trade off erasure probability, by simply ignoring the transmission, with error probability from errors generated by attempting to decode communications based on an incorrect channel activity detection. In some examples, transmissions may use a L1 logical channel for transmission of integrity check information. In some examples, an existing L1 channel may be reused (e.g., the physical frame format indicator channel (PFFICH) for DL transmissions) for the integrity check information, and in other examples a new L1 logical channel may be provided. For example, a new L1 logical channel may be provided that may have a similar structure to PFFICH, and that may have one code word, for example. In some examples, locations of the integrity check logical channel within transmissions (e.g., resource elements (REs) used for the integrity check channel) may be different for different combinations of frequency channels used in a transmission. For example, a first set of REs may be used for the integrity check information for frequency channels 0, 1, and 3, while a different set of REs may be used for frequency channels 1, 2, and 3. A receiver may attempt to determine integrity check information from the set of REs associated with the detected channel activity, and confirm correct channel activity detection based on a comparison of the integrity check information with expected integrity check information for the detected channel activity.

Figure 4:
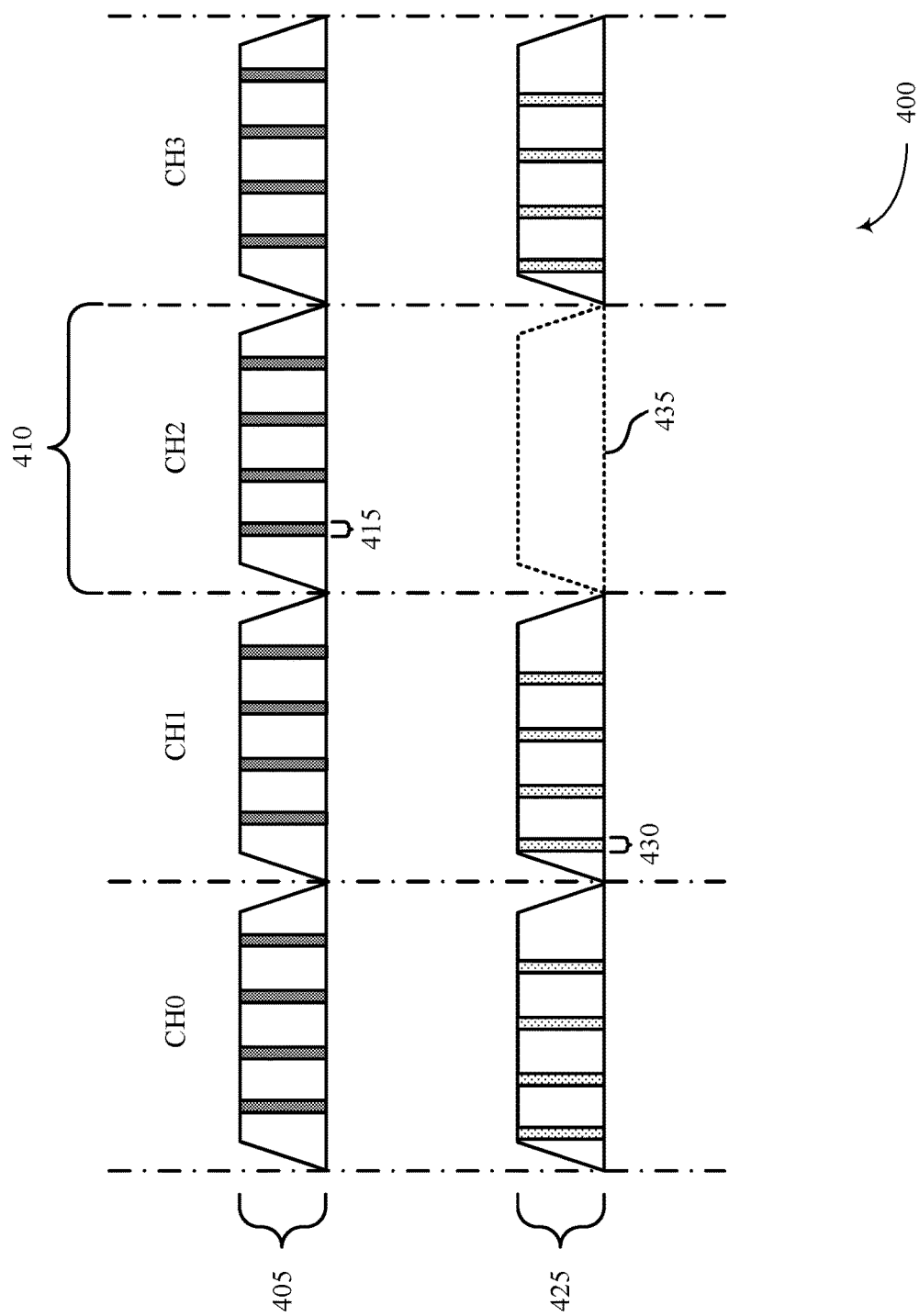

An example of channel activity detection and confirmation is illustrated in FIG. 4, which provides an example of a multi-channel communication 400 with integrity check information for reliable multi-channel activity detection. In some cases, multi-channel communication 400 may represent aspects of techniques performed by a UE 115 or base station 105 as described with reference to FIGS. 1-2. FIG. 4 provides an example of the use of integrity check information in multi-channel communications.

In the example of FIG. 4, a wireless device may send a multi-channel transmission 405, which includes multiple channels 410. In some examples, each channel 410 may include integrity check information at first locations 415 within each channel 410 (e.g., REs associated with integrity check information). In some cases, the integrity check information may follow the preamble within each channel 410, and may be a random sequence that is uniformly hashed to the REs at locations 415 in each channel 410. In some cases, the RE used, or the scrambling sequence for the integrity check information, may be different for different channel activity patterns (e.g., CH0/1/2 have a first pattern and CH1/2/3 have a second pattern, etc.). In some cases, channel activity patterns may be represented by a bit map that may be used to generate a seed or scrambling sequence for scrambling of the integrity check information.

As mentioned above, if a jammer (not shown) is present in CH2, then the receiver may assume that CH0, CH1, and CH3 were used for transmission. Upon determining the channel activity detection results 425, the receiver may determine second locations 430 of the integrity check information under the assumption that only CH0/1/3 were used as a result of the missing channel information 435. The receiver may calculate a soft metric as a comparison between log likelihood ratios (LLRs) calculated for the second locations and expected LLRs based on the channel detection. However, since integrity check information was not transmitted in second locations 430, the soft metric may have a relatively small value due to little or no correlation between the LLRs at the second locations and the integrity check information, or a value that is less than a pre-defined threshold. Based on the value of the soft metric, the receiver may determine that the assumed channel usage is incorrect. In some examples, a predefined threshold is set for the soft metric. In certain examples, the value of the soft metric may be signaled in, for example, radio resource control signaling.

Continuing with the example of FIG. 4, as the second locations 430 are different than the first locations 415, the value of the soft metric will likely be lower than a pre-defined threshold, and the receiver may determine that the initial assumption for the actual channels used for transmission is incorrect. In some examples, the receiver may treat the communication as a detection erasure by simply ignoring the received transmissions. The transmitter in such cases may determine that an acknowledgment of the transmissions is not received and retransmit following a period of time, according to established feedback and retransmission protocols, for example.

While different locations of integrity check channel REs are illustrated in FIG. 4, in other examples integrity check channel locations may be at a same location within each channel, but different coding used for different channel activity, which may be used to determine if the assumption of channel activity at the receiver is correct.

Additionally, in some examples, one or more additional integrity check candidates may be used on additional candidate subsets of channels. For example, a receiver may detect a signal strength on one channel that is different than a signal strength of the channels in which the receiver detected the preamble transmissions. The receiver may use this information to determine that a jammer may be present that is providing the different signal strength. In such a case, the receiver may also attempt to verify the integrity check information for the subset of channels that includes the jammed channel. If the integrity check information for the alternate candidate subset of channels checks out, the receiver may attempt to decode received transmissions based on the alternate candidate subset.

Figure 5:
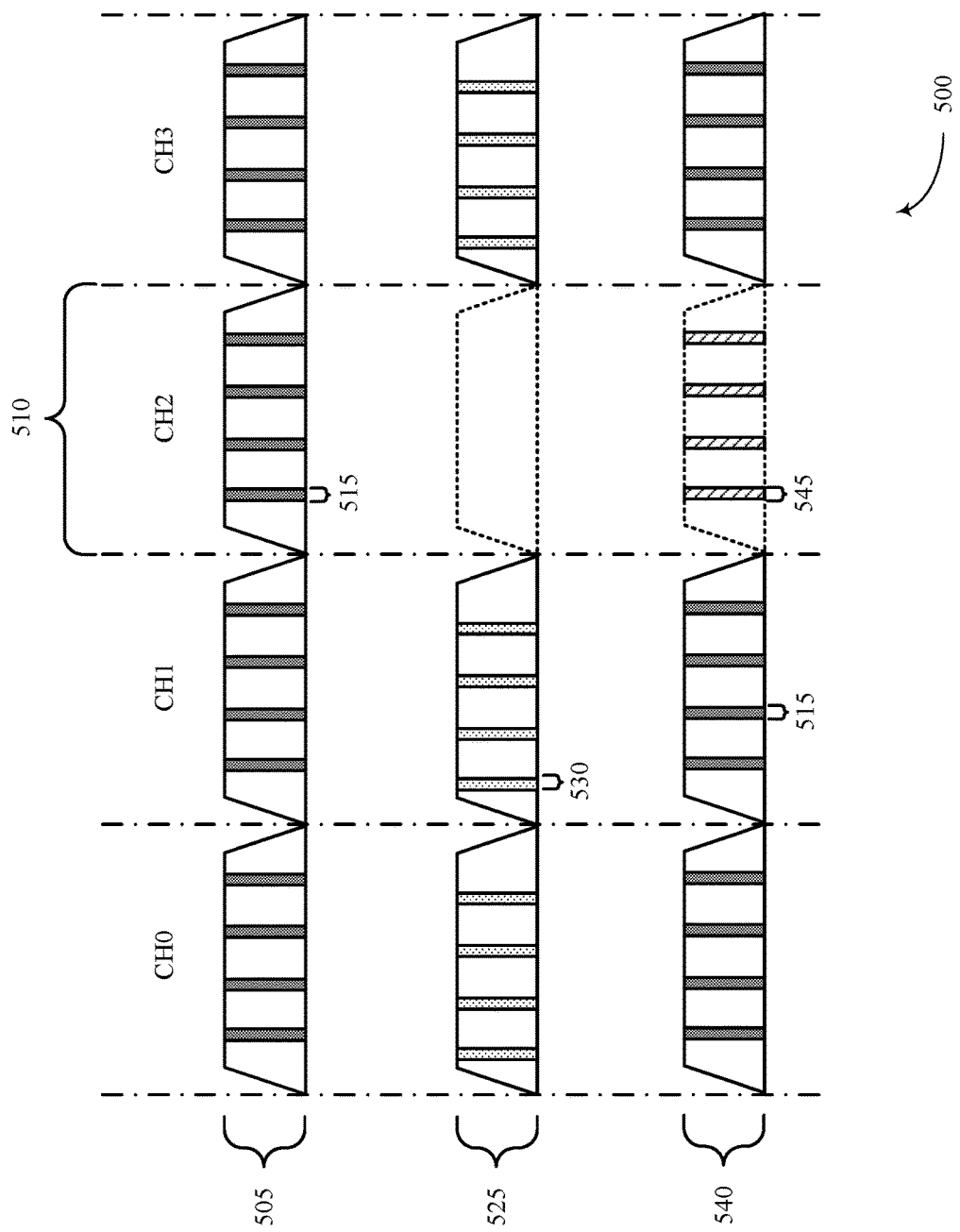

FIG. 5 illustrates an example of a multi-channel communication 500 for an integrity check using other candidates for multi-channel activity. In some cases, multi-channel communication 500 may represent aspects of techniques performed by a UE 115 or base station 105 as described with reference to FIGS. 1-2. FIG. 5 illustrates an example of an integrity check verification using additional channel activity detection candidates.

In the example of FIG. 5, a wireless device may send a multi-channel transmission 505 that includes multiple channels 510. In some examples, each channel 510 may include integrity check information at first locations 515 within the transmissions. Similarly as discussed above, the first locations may be determined based on the particular combination of channels used for transmission. In some cases, the integrity check information may follow the preamble within each channel 510, and may be a random sequence that is uniformly hashed to the REs of the corresponding channel at first locations 515 within each channel. In some cases, the RE used, or the scrambling sequence for the integrity check channel may be different for different channel activity patterns (e.g., CH0/1/2/3 are mapped to first locations versus CH0/1/3 mapped to second locations, etc.).

As previously mentioned, if a high energy jammer (not shown) is present in CH2, then based on a first channel activity detection candidate 525 that is identified by a receiver, the receiver may assume that CH0, CH1, and CH3 were used for transmission. The receiver may calculate a soft metric, where the value of the soft metric may be computed over second integrity check locations 530 with the assumption that that, for example, only CH0, CH1, and CH3 were used in transmission. However, because the second locations 530 do not contain integrity check information, the soft metric may have a relatively small value, or a value that is less than a pre-defined threshold, and the receiver may determine that the assumed channel usage is incorrect.

In some cases, a second channel activity detection candidate 540 may be identified by a receiver, where the soft metric may be computed over first integrity check channel locations 515 with the assumption that all four channels (CH0/1/2/3) were used in transmission. In some cases, the CH2 estimation may not be available due to REs at location 545 being absent, and the soft metric computation may not include the integrity channel locations in CH2. In some cases, even when fewer REs are used to compute the soft metric, the soft metric may still be above the pre-defined threshold when the signal to noise ratio is reasonably good and CH0/1/2/3 may be declared as the actual channel activity.

In some cases, the integrity check information may be transmitted after the preamble on each channel 510. In some examples, the integrity check channel may be a known random sequence uniformly hashed to the REs in the sub-channels used. The REs used and/or the scrambling sequence for the integrity check channel may be different for different channel activity patterns, as mentioned above. When the receiver detects a channel activity pattern, it may identify the REs used for the integrity check channel and collect LLRs for each bit. A soft metric may then be computed by descrambling the LLRs using the known sequence.

In some cases the soft metric may take on different values according to the assumption of channel activity used in the soft metric calculation. For example, if the assumption for the channel activity is correct, the soft metric may be relatively large. Alternately, if the assumption of the channel activity is incorrect, the REs collected may also be incorrect. That is, the collected sequence may be uncorrelated to the known integrity check channel sequence, thus the soft metric may be relatively small. In some cases, the receiver may only consider the channel activity detection successful when soft metric is above a pre-defined threshold. In other examples, if the integrity check channel doubles to carry other information (i.e., includes multiple code words), the soft metric may be the maximum value of the soft metric of all code words.

As an example, a transmitter may provide signaling during a first transmission time period across four channels (e.g., channels 0, 1, 2, and 3) and the integrity check information may be transmitted in certain locations in each of the four channels. However, due to a jammer in one channel, such as CH2, the receiver may only detect that CH0/1/3 are being used. The receiver, based on the channel activity detection, may identify a set of locations for the integrity check channel associated with CH0/1/3 transmissions. The receiver may then check the integrity check channel under the assumption that only CH0/1/3 are used, and will determine that the soft metric is lower than the pre-defined threshold. As a result, the receiver may declare the CH0/1/3 detection result is not valid and treat it as a detection erasure. For example, the REs collected in the locations of the channel activity detection results may be uncorrelated from the known integrity check channel sequence. In such a case, the receiver may declare receptions of the first transmission time period to be unreliable and treat such receptions as not having been received, or as an erasure, in order to prompt retransmission. Such a process may prevent a HARQ error from being propagated to a future transmission.

In some examples, as mentioned above, further processing may be used to help improve communication reliability by correcting, at least to some extent, such erasure events. In some examples, the receiver may form multiple sub-channel candidates for channel activity detection results. For example, if a channel is not detected as being used, but there is a jammer detected (e.g., a signal with a higher total energy level than other sub-channels), then the receiver may form two candidates with the jammed channel to be on or off, as it is possible the jammed channel may still have been used for the transmission but not detected due to jamming. Accordingly, in some examples, a candidate management block may be used to generate candidates that may be evaluated to determine if they are likely the actual channels used for the transmission. In some examples, for the jammed channel, channel estimation may not be available and the LLR values may also not be available, in which case the soft-metric accumulation for the locations in the jammed channel may be skipped.

The accumulated soft-metric for the remaining channels may be greater than a threshold value, which may indicate that the actual channels used for a transmission likely included the jammed channel. In some examples, the threshold value for the soft metric may be compensated to account for the soft metric being computed over less than all of the channels used by the transmitter. The receiver may then attempt to decode the received transmission based on this information. The determination of candidate subsets of channels may be made according to various different techniques. In some examples, all channel usage combinations may be considered by the receiver, and the combination with the highest soft-metric value may be selected to determine the likely transmission channels used for the transmission. In other examples, an energy level detected for each of the channels may be evaluated, and if an energy level for one or more channels was relatively close to a value that would have caused the particular channel(s) to have been included in the initial subset of channels, combinations using these channel(s) may be included in candidate subsets of channels.

More specifically, using the example where a jammer is detected in one channel following transmission on four channels, as discussed above, the receiver may form two different candidates (e.g., CH0/1/3 and CH0/1/2/3 in the case where a jammer is detected on CH2). For the first candidate (CH0/1/3), the soft metric may be computed over the corresponding integrity check locations assuming CH0/1/3 are used. The resulting soft metric calculation may be small if the assumption is incorrect. For the second candidate (CH0/1/2/3), the soft metric may be computed over the integrity check locations assuming CH0/1/2/3 are used. However, as the channel estimation for CH2 may not be available, the soft-metric computation may skip the integrity check channel locations in CH2. Therefore, even though fewer REs may be used to compute the soft metric, the soft metric may be determined to be above the pre-defined threshold, and CH0/1/2/3 may be declared as the actual channel activity. The receiver may then continue to attempt to decode the transmissions based on the declared actual channel activity, and may be successful in receiving and decoding at least a portion of the transmission.

In some cases, for DL communication using eCCs, on the base station side, a DL burst may start with a CRS, followed by a transmission of the integrity check (e.g., a reused PFFICH), where CRS may only be transmitted over the channels used. In some cases, the CRS scrambling does not depend on the channel usage pattern. In some examples, as mentioned above, the locations of integrity check channel REs may be interleaved such that under different channel usage assumptions, the same integrity check channel RE may not be hashed to the same location. In some examples, a UE may perform CRS detection per channel and if CRS is detected, the UE may use CRS for channel estimation and proceed with the integrity check channel decoding, in examples where integrity check channel information is coded. In examples where there is not coding of the integrity check information, there is no decoding and the UE may simply compute a descrambled LLR sum. The UE may compute the soft metric and compare the soft metric with a threshold. If the soft metric is above the threshold, the UE may declare that a DL burst has been detected. If the soft metric is below the threshold, the UE may declare the CRS detection was a false detection, and may optionally continue to attempt to determine additional candidate subset(s) of channels and perform a soft metric calculation based on the other candidate subset(s).

For example, CRS may be detected in some channels and a jammer detected in other channels (which may possibly be a miss-detection), or some detected channels may have a large interference level (which may possibly be a false detection). Other candidate subsets may be identified based on such CRS detections, and extra integrity check channel decoding may be attempted. For channels where CRS is not detected, there may be no channel estimation available, in which case the UE may simply treat the associated REs as if they are erased and not included in the soft metric. The UE may compare the decoded soft metric across all of the identified candidates and pick the one with the maximum soft metric value for further processing.

In other examples, for UL communication using eCCs, the UE may receive an UL grant from a base station, and only transmit over the channels that have been granted and that clear a subsequent LBT procedure. In some examples, if only one channel is granted in the UL grant, an integrity check channel may not be included with the transmission. In cases where more than one channel is granted, an integrity check channel may be transmitted after DM-RS transmission. In some cases, the integrity check channel may have similar structure as a DL PFFICH, but without coding (e.g., a special UE specific 48 RE quadrature phase shift keying (QPSK) sequence). In some examples, the integrity check channel RE locations may depend on the channel usage pattern. The base station, according to some examples, may only perform DM-RS detection per 20 MHz channel for the channels granted.

If DM-RS is detected, the base station may use DM-RS for channel estimation and proceed with integrity check channel soft metric computation. In examples where there is no coding on the channel, there is no decoding and the base station may simply compute a descrambled LLR sum. The base station may then compare the soft metric with a threshold, where an UL burst has been detected if the LLR sum or soft metric is above the threshold, or declare that DM-RS detection was a false positive if the LLR sum or soft metric falls below the threshold. Following such a determination, the base station, in some examples, may continue on to determine one or more additional candidate subsets of carriers and perform the integrity check channel soft metric computation on the additional candidate(s) and attempt reception/decoding where one of the candidates is determined to be the actual channels used for the transmission, in a similar manner as discussed above.

Figure 6:
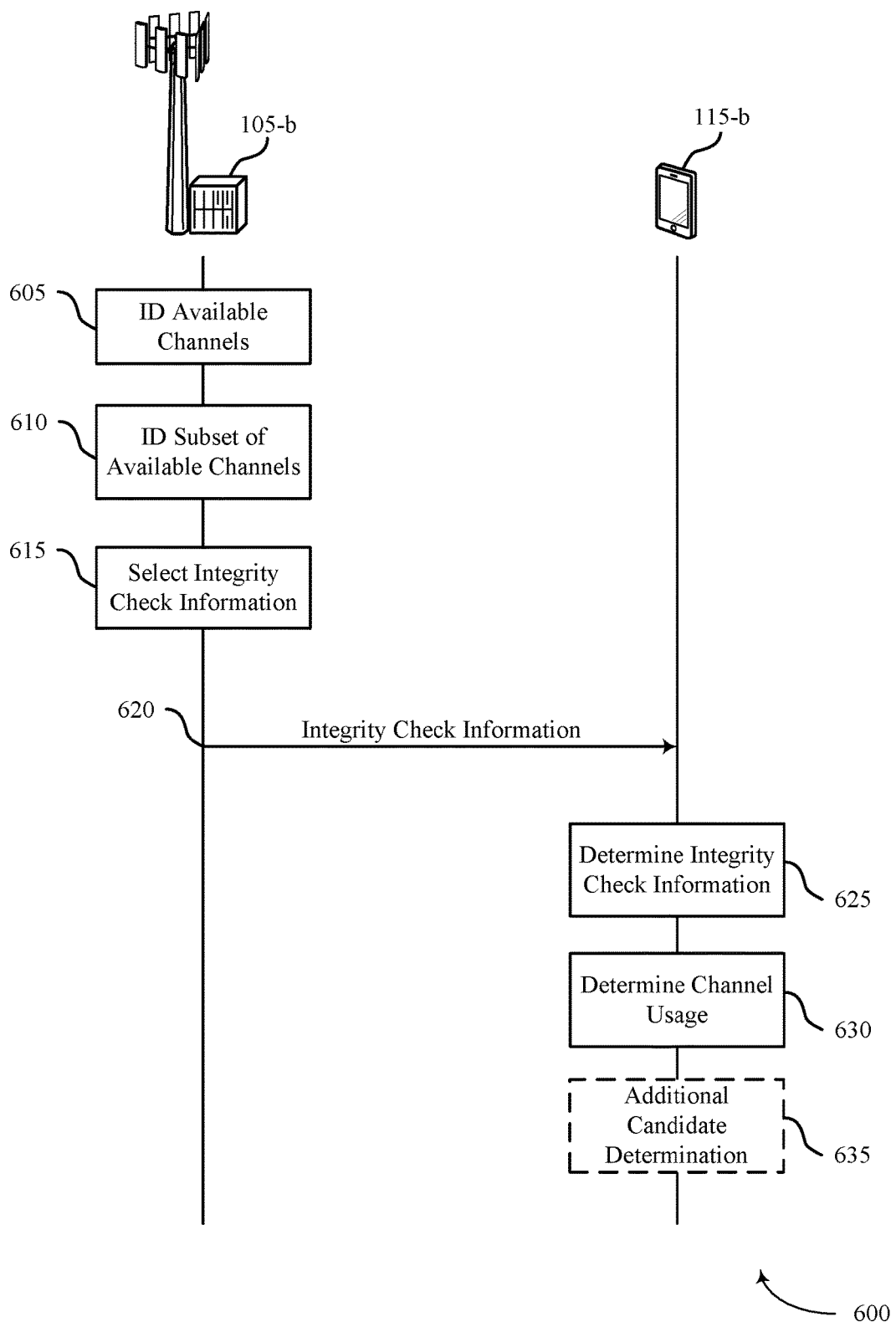
FIG. 6 illustrates an example of a process flow in a system that supports integrity check techniques for reliable multi-channel activity detection in accordance with aspects of the present disclosure.

FIG. 6 illustrates an example of a process flow 600 for an integrity check for reliable multi-channel activity detection in accordance with various aspects of the present disclosure. Process flow 600 may include base station 105-*b* and UE 115-*b*, which may be examples of the corresponding devices described with reference to FIG. 1-5. Although process flow 600 represents an example in which base station 105-*b* identifies and transmits integrity check information for reception by UE 115-*b*, either device may alternate between transmitting and receiving the integrity check information.

At step 605, base station 105-*b* may identify two or more available wireless communications channels for transmitting wireless communications. In some examples, the available wireless communications channels may be part of a set of available wireless communications channels that includes wireless communications channels in a shared radio frequency spectrum band (e.g., four 20 MHz channels of an 80 MHz transmission bandwidth). In some cases, the identification of the two or more wireless communications channels available for transmission during the first time period may be based on an LBT procedure performed on each wireless communications channel of the set of available wireless communications channels. The LBT procedure may determine availability of each channel for transmissions during the first time period and may be used to identify at least one wireless communications channel that may be used for a wireless transmission during the first time period, as indicated at block 610.

In some examples, when the process is performed by a UE 115-*b*, the set of available wireless communications channels may be received in an uplink grant from base station 105-*b* and include wireless communications channels in a shared radio frequency spectrum band. In such cases, the identifying the wireless communications channels available for transmission during the first time period may include performing an LBT procedure on each wireless communications channel of the uplink grant to determine availability of each channel for UL transmissions during the first time period. The UE 115-*b* may then identify, based on the LBT procedure, at least one wireless communications channel of the set of available wireless communications channels that is available for transmissions during the first time period based on the LBT procedure.

At step 615, base station 105-*b* may select integrity check information that indicates the identified at least one wireless communications channel available for transmission during the first time period. In some examples, base station 105-*b* may determine the locations of the integrity check information within the transmissions on each of the wireless communications channels based at least in part on which wireless communications channels of the set of available wireless communications channels are used to transmit the wireless communications. In some cases, the integrity check information includes a known bit sequence uniformly hashed to REs at the determined locations. In some examples, a bit pattern (e.g., a bit map) of the integrity check information is determined based at least in part on which wireless communications channels of the set of available wireless communications channels are used to transmit the wireless communications. In certain examples, the integrity check information includes a UE-specific 48 RE QPSK sequence.

The base station 105-*b* may transmit the integrity check information 620 in the identified at least one wireless communications channel during the first time period, and UE 115-*b* may receive the wireless communications over the subset of wireless communications channels. In some examples, base station 105-*b* may transmit a reference signal (RS) using each of the identified wireless communications channels, where the integrity check information is transmitted after the RS in each of the identified wireless communications channels. In some cases, the UE may identify a subset of wireless communications channels as each channel on which the RS is detected. In some examples, the integrity information transmitted by base station 105-*b* uses a L1 channel, such as the PFFICH or a new L1 channel. In other examples, when UE 115-*b* transmits the integrity check information, the integrity check information may be transmitted by UE 115-*b* using a L1 channel. At step 625, UE 115-*b* may determine integrity check information in the wireless communications channels of the identified subset of wireless communications channels received.

At step 630, UE 115-*b* may determine, based at least in part on the integrity check information, whether the identified subset of wireless communications channels is the same as an actual subset of wireless communications channels used for transmission of the wireless communications during the first time period. In some cases, UE 115-*b* may determine, based at least in part on the integrity check information, whether one or more other subsets of wireless communications channels can potentially be the actual subset of wireless communications channels used for transmission of the wireless communications during the first time period. In some cases, the determining includes determining locations of the integrity check information within the transmissions on each wireless communications channel of the identified subset of wireless communications channels based at least in part on which wireless communications channels of the set of available wireless communications channels are included in the subset of wireless communications channels, determining an LLR for each of the locations of the integrity check information, descrambling the LLRs using a predetermined bit sequence associated with the subset of wireless communications channels, and computing a soft metric based at least in part on a correlation between the descrambled LLRs and the predetermined bit sequence associated with the subset of wireless communications channels.

In some examples, the UE 115-*b* may optionally determine that another subset of the set of available wireless communications channels other than the identified subset may potentially be used for transmission of the wireless communications during the first time period, as indicated at block 635. Such a determination may be made, for example, when the soft metric is below a threshold. In some examples, soft metrics may be determined for each of one or more other subsets of channels, and one of the subsets may be selected based on the determined soft metrics.

In some cases, the integrity check information includes a predetermined bit sequence uniformly hashed to REs at the determined locations, and the determined locations are determined based at least in part on which wireless communications channels of the set of available wireless communications channels are used to transmit the wireless communications. In some cases, the predetermined bit pattern of the integrity check information is identified based at least in part on which wireless communications channels of the set of available wireless communications channels are used to transmit the wireless communications.

In some cases, when it is determined that the identified subset of wireless communications channels is not the same as an actual subset of wireless communications channels used for transmission of the wireless communications during the first time period and the UE 115-*b* determines that a first candidate subset of the one or more candidate subsets was used for transmission of the wireless communications, the UE 115-*b* may decode at least a portion of the wireless communications based on the first candidate subset.

In some examples, identifying one or more candidate subsets includes determining that another transmitter is transmitting using a first wireless communications channel of the set of available wireless communications channels and identifying a first candidate subset that includes the subset of wireless communications channels and the first wireless communications channel. In some cases, identifying the subset of wireless communications channels includes measuring an energy level of each wireless communications channel of the set of wireless communications channels and identifying the subset of wireless communications channels as each channel of the set of wireless communications channels having an energy level that exceeds a threshold.

Figure 7:
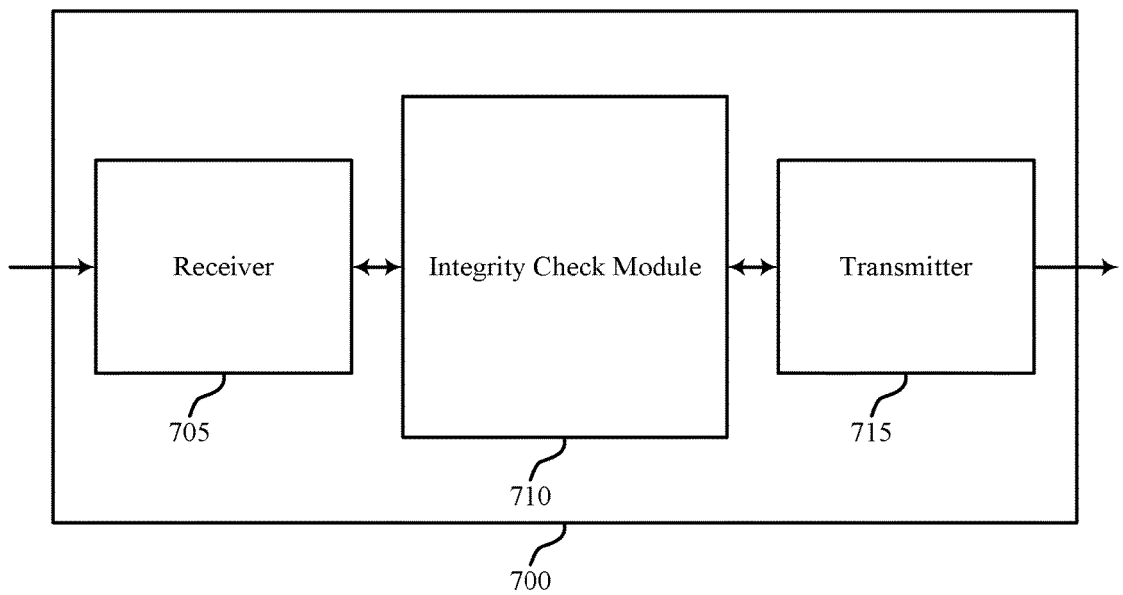
FIGS. 7-9 show block diagrams of a wireless device that supports integrity check techniques for reliable multi-channel activity detection in accordance with aspects of the present disclosure.

FIG. 7 shows a block diagram of a wireless device 700 that supports an integrity check channel for reliable multi-channel activity detection in accordance with various aspects of the present disclosure. Wireless device 700 may be an example of aspects of a UE 115 or base station 105 described with reference to FIGS. 1-6. Wireless device 700 may include receiver 705, integrity check module 710 and transmitter 715. Wireless device 700 may also include a processor. Each of these components may be in communication with each other.

The receiver 705 may receive information such as packets, user data, or control information associated with various information channels (e.g., control channels, data channels, and integrity check information for reliable multi-channel activity detection, etc.). Information may be passed on to other components of the device. The receiver 705 may be an example of aspects of the transceiver 1025 described with reference to FIG. 10 or the transceiver 1125 described with reference to FIG. 11.

The integrity check module 710, when wireless device 700 is receiving transmissions, may identify a subset of wireless communications channels of a set of available wireless communications channels that contain wireless transmissions during a first time period, manage receipt of wireless communications over the subset of wireless communications channels, determine integrity check information in the wireless communications channels of the subset of wireless communications channels, and determine, based at least in part on the integrity check information, whether the identified subset of wireless communications channels is the same as an actual subset of wireless communications channels used for transmission of the wireless communications during the first time period.

The integrity check module 710, when wireless device 700 is transmitting communications, may identify a set of two or more available wireless communications channels for transmitting wireless communications, identify at least one wireless communications channel of the set of available wireless communications channels that is available for transmission during a first time period, select integrity check information that indicates the identified at least one wireless communications channel, and manage transmission of the integrity check information in the identified at least one wireless communications channel during the first time period. The integrity check module 710 may also be an example of aspects of the UE integrity check module 1005 described with reference to FIG. 10 or the base station integrity check module 1105 described with reference to FIG. 11.

The transmitter 715 may transmit signals received from other components of wireless device 700. In some examples, the transmitter 715 may be collocated with a receiver in a transceiver module. For example, the transmitter 715 may be an example of aspects of the transceiver 1025 described with reference to FIG. 10 or the transceiver 1125 described with reference to FIG. 11. The transmitter 715 may include a single antenna, or it may include a plurality of antennas.

Figure 8:
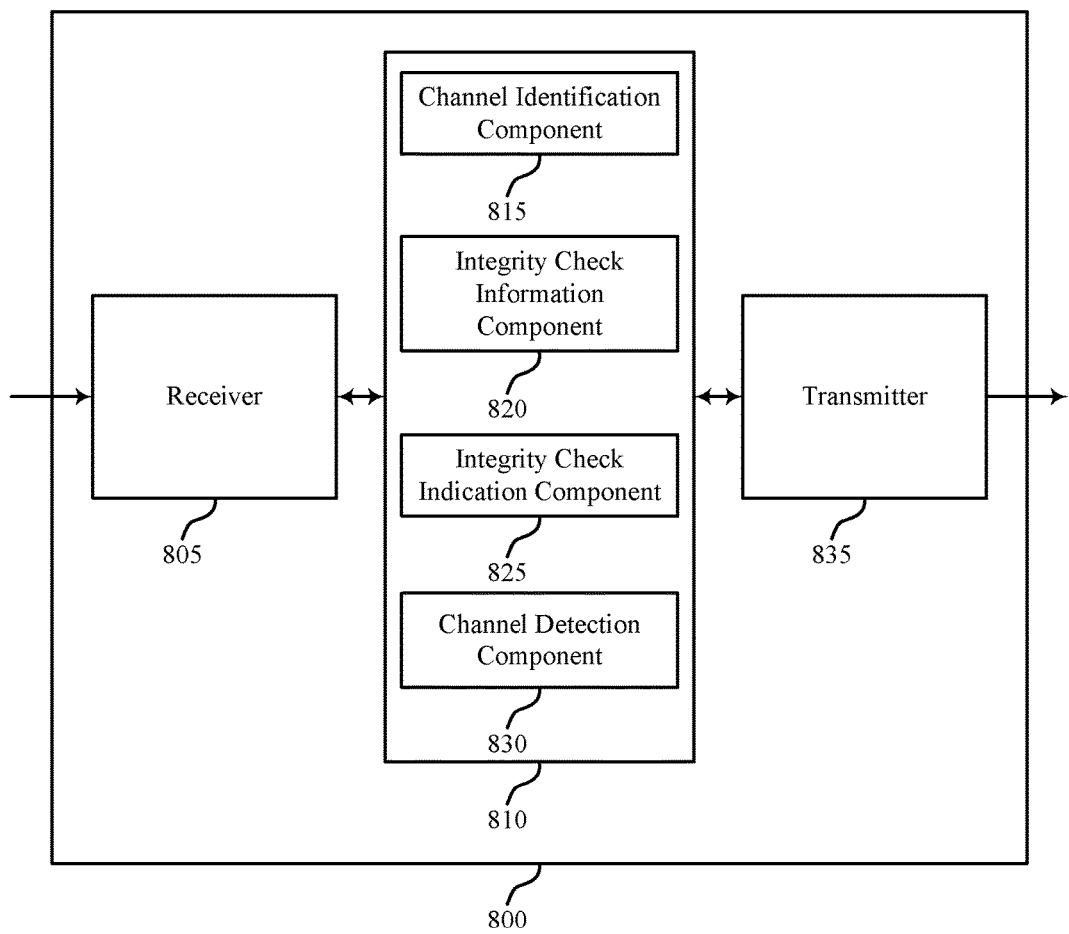

FIG. 8 shows a block diagram of a wireless device 800 that supports an integrity check channel for reliable multi-channel activity detection in accordance with various aspects of the present disclosure. Wireless device 800 may be an example of aspects of a wireless device 700 or a UE 115 or base station 105 described with reference to FIGS. 1-7. Wireless device 800 may include receiver 805, integrity check module 810 and transmitter 835. Wireless device 800 may also include a processor. Each of these components may be in communication with each other.

The receiver 805 may receive information which may be passed on to other components of the device. The receiver 805 may also perform the functions described with reference to the receiver 705 of FIG. 7. The receiver 805 may be an example of aspects of the transceiver 1025 described with reference to FIG. 10 or the transceiver 1125 described with reference to FIG. 11.

The integrity check module 810 may be an example of aspects of integrity check module 710 described with reference to FIG. 7. The integrity check module 810 may include channel identification component 815, integrity check information component 820, integrity check indication component 825 and candidate detection component 830. The integrity check module 810 may be an example of aspects of the UE integrity check module 1005 described with reference to FIG. 10 or the base station integrity check module 1105 described with reference to FIG. 11.

The channel identification component 815 may identify a set of two or more available wireless communications channels for transmitting wireless communications, and identify at least one wireless communications channel of the set of available wireless communications channels that is available for transmission during a first time period. The identification of the set of available wireless communications channels may be based on a number of sub-channels available in a shared radio frequency band, and the at least one wireless communications channel may be identified based on an LBT procedure performed on each of the channels, for example. The integrity check information component 820 may determine integrity check information in the wireless communications channels of the subset of wireless communications channels, and select integrity check information that indicates the identified at least one wireless communications channel available for transmission during the first time period. In some cases, the integrity check information includes a UE-specific 48 RE QPSK sequence. In some cases, the integrity check information includes a predetermined bit sequence uniformly hashed to REs at the determined locations. The determined locations may be determined based at least in part on which wireless communications channels of the set of available wireless communications channels are used to transmit the wireless communications. In some cases, a predetermined bit pattern of the integrity check information may be identified based at least in part on which wireless communications channels of the set of available wireless communications channels are used to transmit the wireless communications.

The integrity check indication component 825 may provide the integrity check information for transmission in the identified at least one wireless communications channel during the first time period, and determine locations of the integrity check information within the transmissions on each of the wireless communications channels based at least in part on which wireless communications channels of the set of available wireless communications channels are used to transmit the wireless communications. In some cases, the integrity check information is transmitted after a RS transmission in each of the identified wireless communications channels.

The channel detection component 830 may identify a subset of wireless communications channels of a set of available wireless communications channels that contain wireless transmissions during a first time period, manage receipt of wireless communications over the subset of wireless communications channels, determine, based at least in part on the integrity check information, whether the identified subset of wireless communications channels is the same as an actual subset of wireless communications channels used for transmission of the wireless communications during the first time period.

The channel detection component 830, in some examples, may determine, based at least in part on the integrity check information, whether one or more other subsets of wireless communications channels can potentially be the actual subset of wireless communications channels used for transmission of the wireless communications during the first time period. In some examples, the channel detection component 830 may also identify a first candidate subset of the one or more other subsets that was potentially used for transmission of the wireless communications during the first time period. The first candidate subset may include, in some examples, the identified subset of wireless communications channels and a first wireless communications channel, in addition to the identified subset, in which interference is detected. In certain examples, the channel detection component may identify the subset of wireless communications channels as each channel of the set of wireless communications channels having an energy level that exceeds a threshold, and identify the first candidate subset that includes the identified subset of wireless communications channels and the first wireless communications channel.

In some cases, the channel detection component 830 may determine locations of the integrity check information within the transmissions on each wireless communications channel of the subset of wireless communications channels based at least in part on which wireless communications channels of the set of available wireless communications channels are included in the subset of wireless communications channels.

The transmitter 835 may transmit signals received from other components of wireless device 800. In some examples, the transmitter 835 may be collocated with a receiver in a transceiver module. For example, the transmitter 835 may be an example of aspects of the transceiver 1025 described with reference to FIG. 10 or the transceiver 1125 described with reference to FIG. 11. The transmitter 835 may utilize a single antenna, or it may utilize a plurality of antennas.

Figure 9:
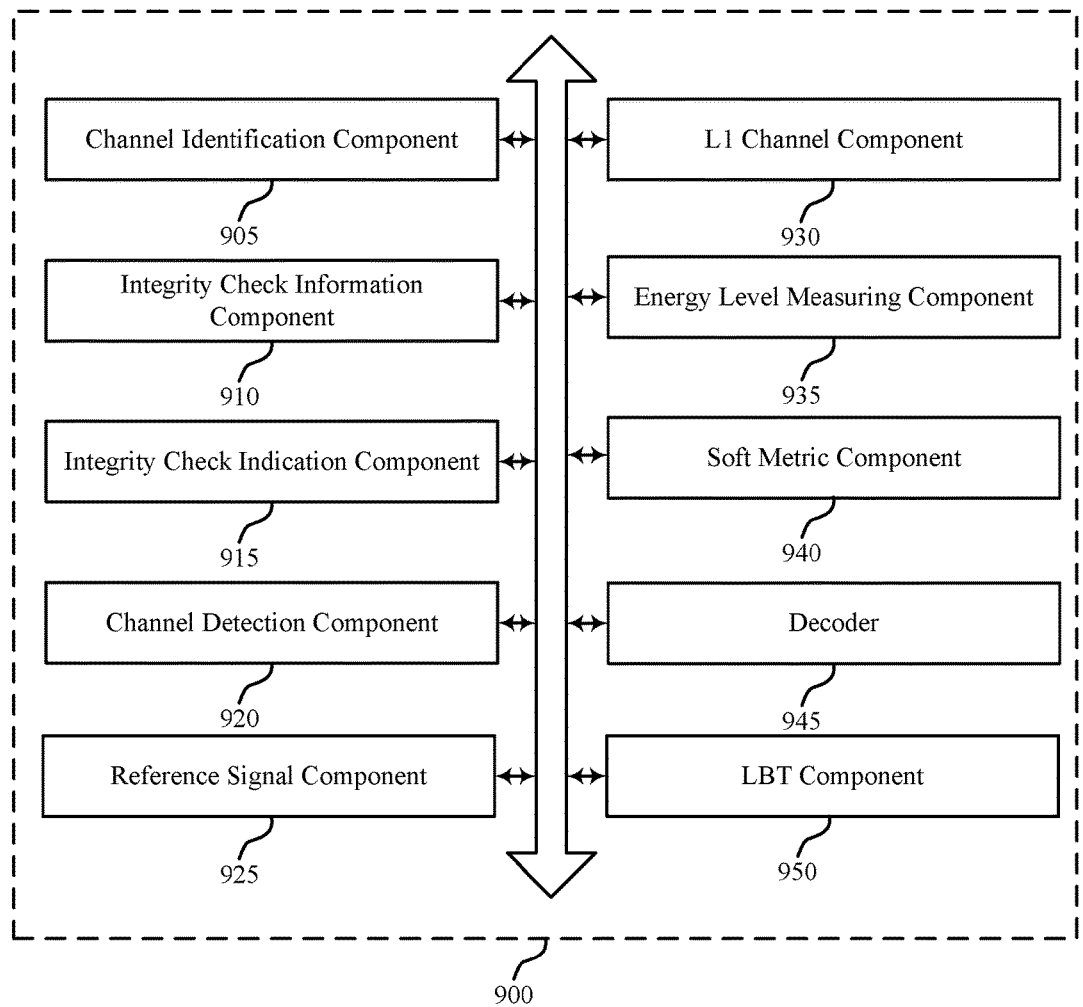

FIG. 9 shows a block diagram of a integrity check module 900 which may be an example of the corresponding component of wireless device 700 or wireless device 800. That is, integrity check module 900 may be an example of aspects of integrity check module 710 or integrity check module 810 described with reference to FIGS. 7 and 8. The integrity check module 900 may also be an example of aspects of the UE integrity check module 1005 described with reference to FIG. 10 or the base station integrity check module 1105 described with reference to FIG. 11.

The integrity check module 900 may include channel identification component 905, integrity check information component 910, integrity check indication component 915, channel detection component 920, reference signal component 925, L1 channel component 930, energy level measuring component 935 (which may include an LLR component), soft metric component 940, and decoder 945, and LBT component 950. Each of these modules may communicate, directly or indirectly, with one another (e.g., via one or more buses).

The channel identification component 905, in cases where the integrity check module 900 is being used for transmitting wireless communications, may identify a set of two or more available wireless communications channels for transmitting wireless communications, and identify at least one wireless communications channel of the set of available wireless communications channels that is available for transmission during a first time period. The set of two or more available wireless communications channels may be identified as two or more sub-channels of a shared radio frequency spectrum band (e.g., four 20 MHz sub-channels of an 80 MHz channel), and the at least one wireless communications channel may be identified based on an LBT procedure performed for each of the sub-channels.

The channel identification component 905, when the integrity check module 900 is being used for receiving wireless communications, may identify a subset of wireless communications channels of a set of available wireless communications channels that contain wireless transmissions during a first time period, and determine, based at least in part on the integrity check information, whether the identified subset of wireless communications channels is the same as an actual subset of wireless communications channels used for transmission of the wireless communications during the first time period.

The channel identification component 905 may also determine, based at least in part on the integrity check information, whether one or more other subsets of wireless communications channels can potentially be the actual subset of wireless communications channels used for transmission of the wireless communications during the first time period. In such cases, the channel identification component 905 may identify a first candidate subset other than the identified subset of wireless communications channels. In some examples, the channel identification component 905 may identify the subset of wireless communications channels as each channel of the set of wireless communications channels having an energy level that exceeds a threshold, and may identify the first candidate subset that includes the subset of wireless communications channels and a first wireless communications channel that may be selected based on a measured energy level associated with the first wireless communications channel.

The integrity check information component 910 may select integrity check information that indicates the identified at least one wireless communications channel available for transmission during the first time period. In some cases, the integrity check information includes a UE-specific 48 RE QPSK sequence. In some cases, the integrity check information includes the predetermined bit sequence uniformly hashed to resource elements at the determined locations. The determined locations may be determined based at least in part on which wireless communications channels of the set of available wireless communications channels are used to transmit the wireless communications. In some cases, the predetermined bit pattern of the integrity check information is identified based at least in part on which wireless communications channels of the set of available wireless communications channels are used to transmit the wireless communications.

The integrity check indication component 915 may transmit the integrity check information in the identified at least one wireless communications channel during the first time period, in cases where the integrity check module 900 is used in transmissions of wireless communications. In cases where the integrity check module 900 is used in receipt of wireless communications, the integrity check indication component 915 may determine locations of the integrity check information within the transmissions on each of the wireless communications channels based at least in part on which wireless communications channels of the set of available wireless communications channels are used to transmit the wireless communications. In some cases, the integrity check information includes a known bit sequence uniformly hashed to resource elements at the determined locations. In some cases, a bit pattern of the integrity check information is determined based at least in part on which wireless communications channels of the set of available wireless communications channels are used to transmit the wireless communications. In some cases, the integrity check information is transmitted after the RS in each of the identified wireless communications channels.

The reference signal component 925 may transmit a RS using each of the identified wireless communications channels. The reference signal may be, for example, a CRS for downlink transmissions, and a DM-RS for uplink communications. The L1 channel component 930 may configure a L1 channel to transmit the integrity check information. In some examples, the L1 channel for downlink transmissions may be a PFFICH.

The energy level measuring component 935 may measure an energy level of each wireless communications channel of the set of wireless communications channels. In some cases, the one or more identified wireless communications channels may be identified by determining that a measured energy level for a wireless communications channel is within a predefined range from an energy threshold that may indicate that the channel is being used for transmissions. In some examples the energy level measuring component 935 may include an LLR component that may determine an LLR for each of the locations of the integrity check information, and descramble the log-likelihood ratios using a predetermined bit sequence associated with the subset of wireless communications channels.

The soft metric component 940 may compute a soft metric based at least in part on a correlation between descrambled log-likelihood ratios and a predetermined bit sequence associated with the identified subset of wireless communications channels, and may determine that another subset of the set of available wireless communications channels other than the identified subset may potentially be used for transmission of the wireless communications during the first time period when the soft metric is below a threshold. The soft metric component 940 may determine that the channels of the identified subset of wireless communications channels were actually used for transmission of the wireless communications during the first time period when the soft metric is above the threshold.

The decoder 960 may decode at least a portion of the wireless communications based on the first candidate subset. In examples where integrity check information is coded in the integrity check channel, the decoder 960 may decode the integrity check information.

The LBT component 950 may identify the at least one wireless communications channel as a channel of the set of available wireless communications channels that is available for transmissions based at least in part on a listen-before-talk procedure. In some cases, the set of available wireless communications channels may include wireless communications channels in a shared radio frequency spectrum band, and the identifying the wireless communications channels available for transmission during the first time period may include performing an listen-before-talk procedure on each wireless communications channel of the set of available wireless communications channels to determine availability of each channel for transmissions during the first time period. In UL transmission cases, the set of available wireless communications channels may be received in an uplink grant from a base station and may include two or more wireless communications channels in a shared radio frequency spectrum band, and where the identifying the wireless communications channels available for transmission during the first time period includes performing a listen-before-talk procedure on each wireless communications channel of the set of available wireless communications channels to determine availability of each channel for transmissions during the first time period for uplink transmissions.

Figure 10:
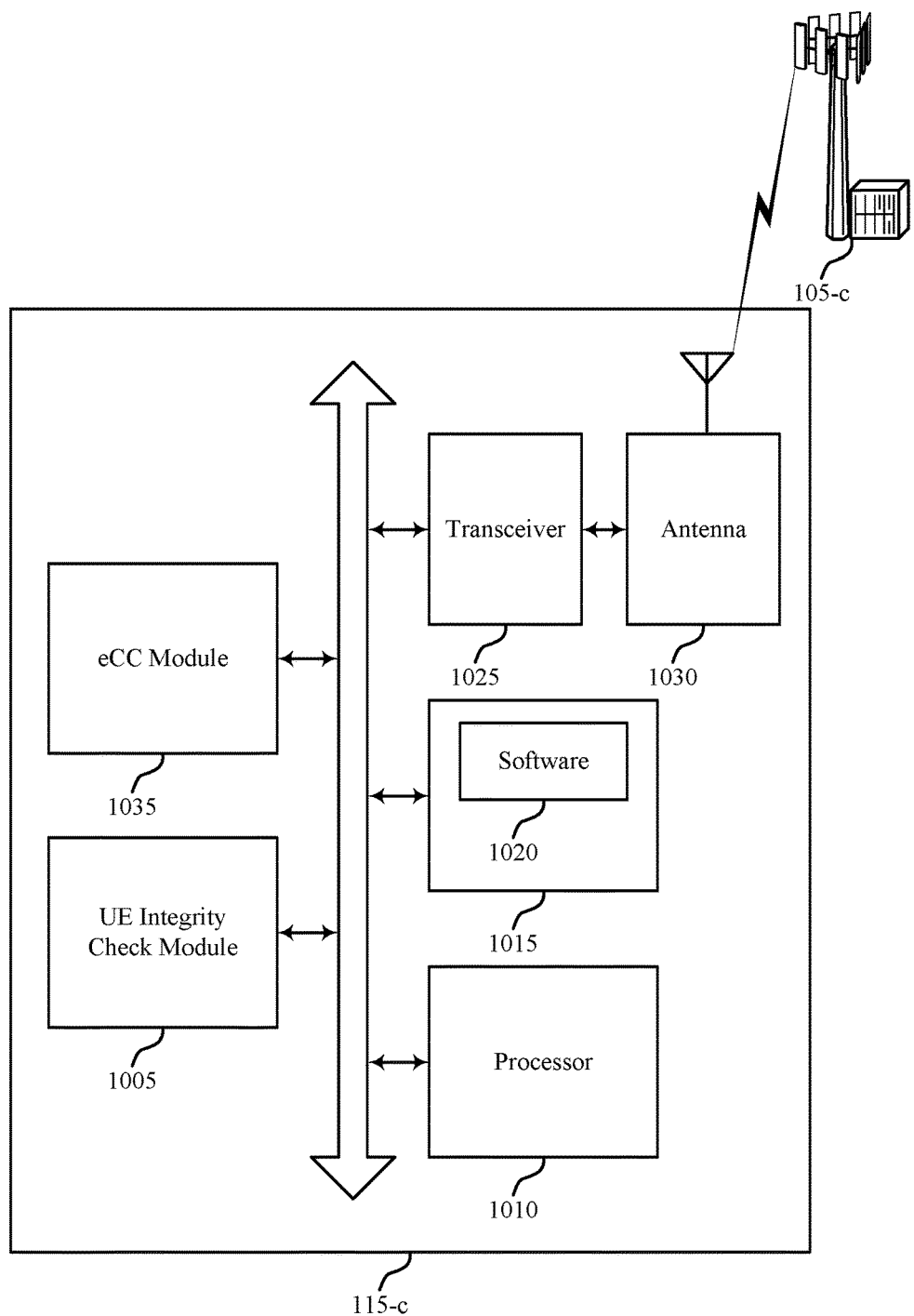
FIG. 10 illustrates a block diagram of a system including a user equipment (UE) that supports integrity check techniques for reliable multi-channel activity detection in accordance with aspects of the present disclosure.

FIG. 10 shows a diagram of a system 1000 including a device that supports an integrity check channel for reliable multi-channel activity detection in accordance with various aspects of the present disclosure. For example, system 1000 may include UE 115-c, which may be an example of a wireless device 700, a wireless device 800, or a UE 115 as described with reference to FIGS. 1-9.

UE 115-c may include UE integrity check module 1005, processor 1010, memory 1015, transceiver 1025, antenna 1030 and eCC module 1035. Each of these modules may communicate, directly or indirectly, with one another (e.g., via one or more buses). The UE integrity check module 1005 may be an example of an integrity check module as described with reference to FIGS. 7 through 9.

The processor 1010 may include an intelligent hardware device, (e.g., a central processing unit (CPU), a microcontroller, an application specific integrated circuit (ASIC), etc.) The memory 1015 may include random access memory (RAM) and read only memory (ROM). The memory 1015 may store computer-readable, computer-executable software including instructions that, when executed, cause the processor to perform various functions described herein (e.g., integrity check channel for reliable multi-channel activity detection, etc.). In some cases, the software 1020 may not be directly executable by the processor but may cause a computer (e.g., when compiled and executed) to perform functions described herein.

The transceiver 1025 may communicate bi-directionally, via one or more antennas, wired, or wireless links, with one or more networks, as described above. For example, the transceiver 1025 may communicate bi-directionally with a base station 105-c. The transceiver 1025 may also include a modem to modulate the packets and provide the modulated packets to the antennas for transmission, and to demodulate packets received from the antennas. In some cases, the wireless device may include a single antenna 1030. However, in some cases the device may have more than one antenna 1030, which may be capable of concurrently transmitting or receiving multiple wireless transmissions. The eCC module 1035 may enable operations using eCCs such as communication using shared or unlicensed spectrum, using reduced transmission time intervals (TTIs) or sub-frame durations, or using a large number of component carriers (CCs).

Figure 11:
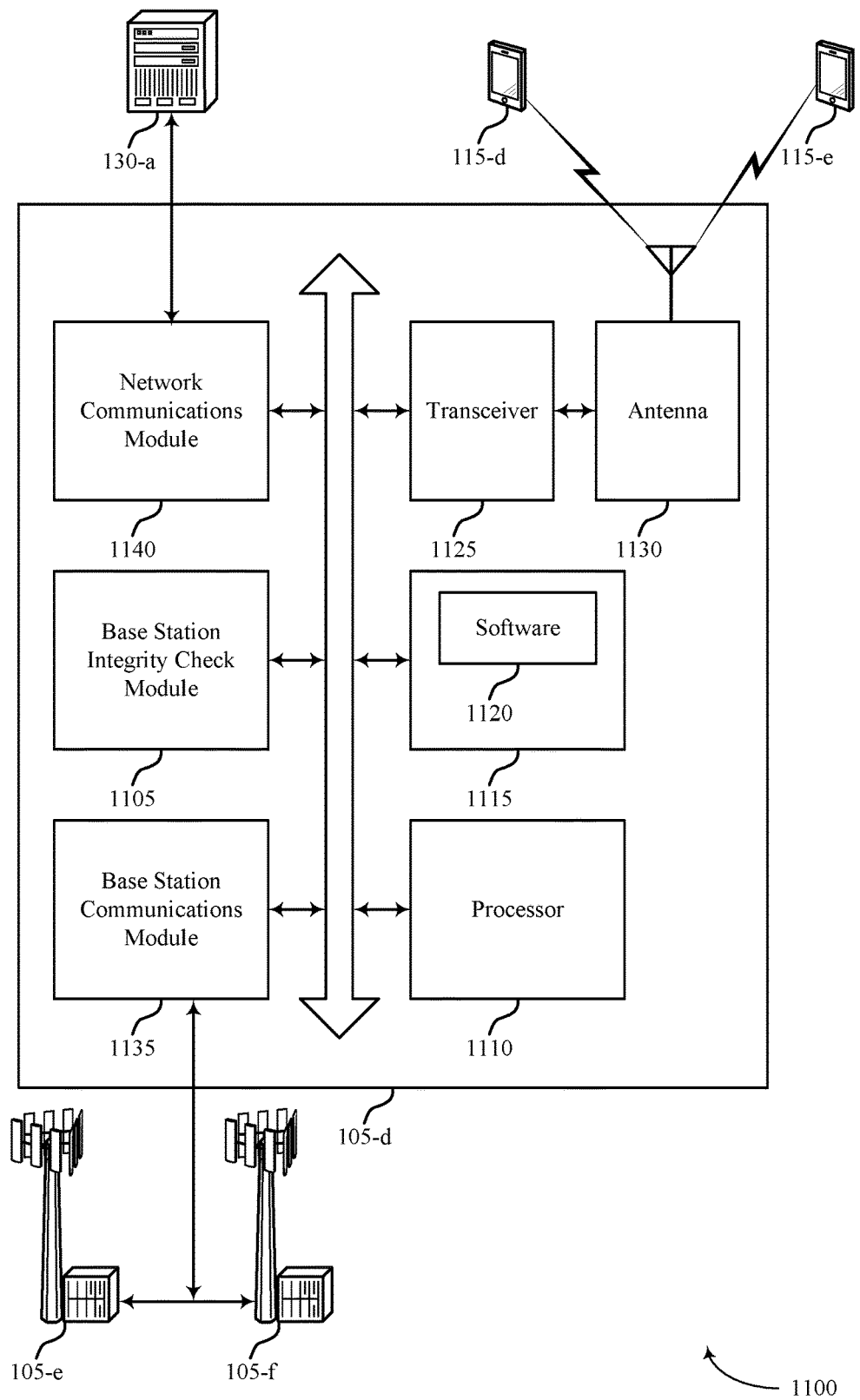
FIG. 11 illustrates a block diagram of a system including a base station that supports integrity check techniques for reliable multi-channel activity detection in accordance with aspects of the present disclosure.

FIG. 11 shows a diagram of a wireless system 1100 including a device configured to support an integrity check channel for reliable multi-channel activity detection in accordance with various aspects of the present disclosure. For example, system 1100 may include base station 105-d, which may be an example of a wireless device 700, a wireless device 800, or a base station 105 as described with reference to FIGS. 1-9. Base station 105-d may include components for bi-directional voice and data communications including components for transmitting communications and components for receiving communications. For example, base station 105-d may communicate bi-directionally with one or more UEs 115, such as UEs 115-d and 115-e.

Base station 105-d may also include base station integrity check module 1105, processor 1110, memory 1115, transceiver 1125, antenna 1130, base station communications module 1135 and network communications module 1140. Each of these modules may communicate, directly or indirectly, with one another (e.g., via one or more buses). The base station integrity check module 1105 may be an example of an integrity check module as described with reference to FIGS. 7 through 9.

The processor 1110 may include an intelligent hardware device, (e.g., a CPU, a microcontroller, an ASIC, etc.) The memory 1115 may include RAM and ROM. The memory 1115 may store computer-readable, computer-executable software including instructions that, when executed, cause the processor to perform various functions described herein (e.g., integrity check channel for reliable multi-channel activity detection, etc.). In some cases, the software 1120 may not be directly executable by the processor but may cause a computer (e.g., when compiled and executed) to perform functions described herein.

The transceiver 1125 may communicate bi-directionally, via one or more antennas, wired, or wireless links, with one or more networks, as described above. For example, the transceiver 1125 may communicate bi-directionally with a base station 105 or a UE 115. The transceiver 1125 may also include a modem to modulate the packets and provide the modulated packets to the antennas for transmission, and to demodulate packets received from the antennas. In some cases, the wireless device may include a single antenna 1130. However, in some cases the device may have more than one antenna 1030, which may be capable of concurrently transmitting or receiving multiple wireless transmissions.

The base station communications module 1135 may manage communications with other base stations 105, such as base station 105-e and base station 105-f, and may include a controller or scheduler for controlling communications with UEs 115 in cooperation with other base stations 105. For example, the base station communications module 1135 may coordinate scheduling for transmissions to UEs 115 for various interference mitigation techniques such as beamforming or joint transmission. In some examples, base station communications module 1135 may provide an X2 interface within an LTE/LTE-A wireless communication network technology to provide communication between base stations 105.

The network communications module 1140 may manage communications with the core network 130-*a* (e.g., via one or more wired backhaul links). For example, the network communications module 1140 may manage the transfer of data communications for client devices, such as one or more UEs 115.

Figure 12:
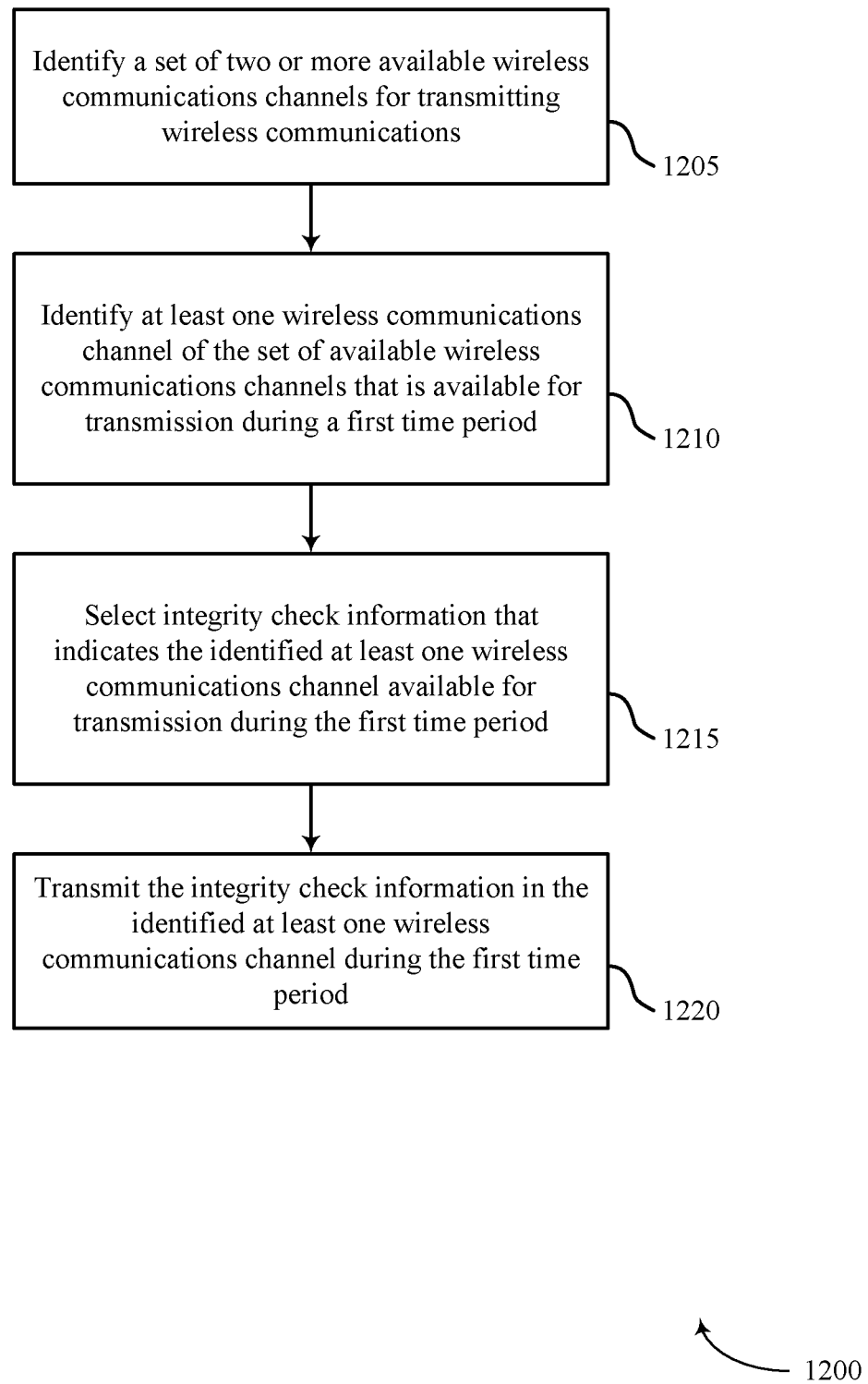
FIGS. 12-17 illustrate integrity check methods for reliable multi-channel activity detection in accordance with aspects of the present disclosure.

FIG. 12 shows a flowchart illustrating a method 1200 for an integrity check channel for reliable multi-channel activity detection in accordance with various aspects of the present disclosure. The operations of method 1200 may be implemented by a UE or base station or its components as described with reference to FIG. 1, 2, 6, 10, or 11. For example, the operations of method 1200 may be performed by the integrity check module as described herein. In some examples, the UE or base station may execute a set of codes to control the functional elements of the device to perform the functions described below. Additionally or alternatively, the UE or base station may perform aspects the functions described below using special-purpose hardware.

At block 1205, the UE or base station may identify a set of two or more available wireless communications channels for transmitting wireless communications as described above with reference to FIGS. 2 through 6. In certain examples, the operations of block 1205 may be performed by the channel identification component as described with reference to FIGS. 8-9.

At block 1210, the UE or base station may identify at least one wireless communications channel of the set of available wireless communications channels that is available for transmission during a first time period as described above with reference to FIGS. 2 through 6. In certain examples, the operations of block 1210 may be performed by the channel identification component as described with reference to FIGS. 8-9.

At block 1215, the UE or base station may select integrity check information that indicates the identified at least one wireless communications channel available for transmission during the first time period as described above with reference to FIGS. 2 through 6. In certain examples, the operations of block 1215 may be performed by the integrity check information component as described with reference to FIGS. 8-9.

At block 1220, the UE or base station may transmit the integrity check information in the identified at least one wireless communications channel during the first time period as described above with reference to FIGS. 2 through 6. In certain examples, the operations of block 1220 may be performed by the integrity check indication component as described with reference to FIGS. 8-9.

Figure 13:
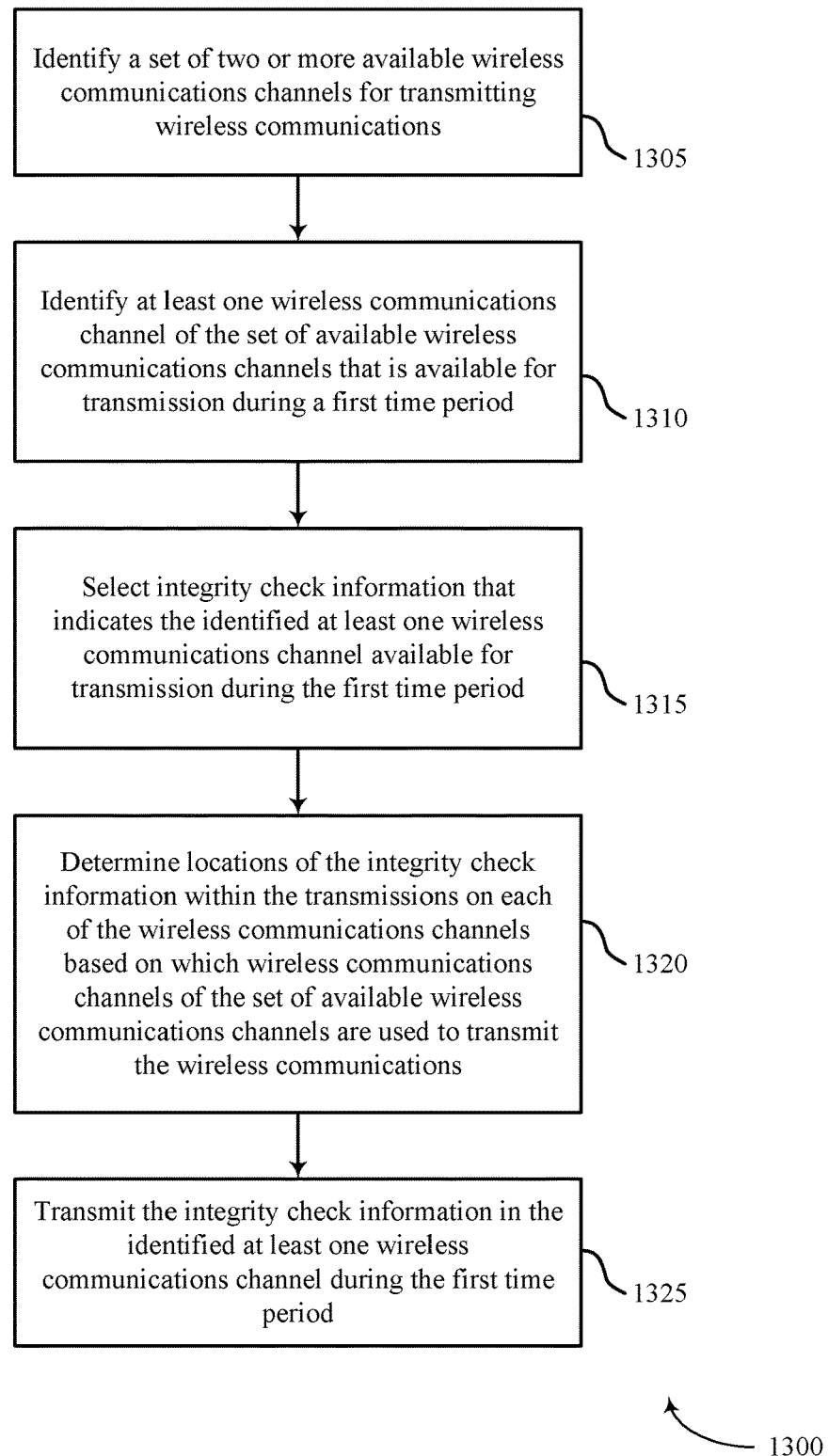

FIG. 13 shows a flowchart illustrating a method 1300 for an integrity check channel for reliable multi-channel activity detection in accordance with various aspects of the present disclosure. The operations of method 1300 may be implemented by a UE 115 or base station 105 or its components as described with reference to FIGS. 1, 2, 6, 10, and 11. For example, the operations of method 1300 may be performed by the integrity check module as described herein. In some examples, the UE or base station may execute a set of codes to control the functional elements of the device to perform the functions described below. Additionally or alternatively, the UE or base station may perform aspects the functions described below using special-purpose hardware.

At block 1305, the UE or base station may identify a set of two or more available wireless communications channels for transmitting wireless communications as described above with reference to FIGS. 2 through 6. In certain examples, the operations of block 1305 may be performed by the channel identification component as described with reference to FIGS. 8-9.

At block 1310, the UE or base station may identify at least one wireless communications channel of the set of available wireless communications channels that is available for transmission during a first time period as described above with reference to FIGS. 2 through 6. In certain examples, the operations of block 1310 may be performed by the channel identification component as described with reference to FIGS. 8-9.

At block 1315, the UE or base station may select integrity check information that indicates the identified at least one wireless communications channel available for transmission during the first time period as described above with reference to FIGS. 2 through 6. In certain examples, the operations of block 1315 may be performed by the integrity check information component as described with reference to FIGS. 8-9.

At block 1320, the UE or base station may determine locations of the integrity check information within the transmissions on each of the wireless communications channels based on which wireless communications channels of the set of available wireless communications channels are used to transmit the wireless communications as described above with reference to FIGS. 2 through 6. In certain examples, the operations of block 1320 may be performed by the integrity check indication component as described with reference to FIGS. 8-9.

At block 1325, the UE or base station may transmit the integrity check information in the identified at least one wireless communications channel during the first time period as described above with reference to FIGS. 2 through 6. In certain examples, the operations of block 1325 may be performed by the integrity check indication component as described with reference to FIGS. 8-9.

Figure 14:
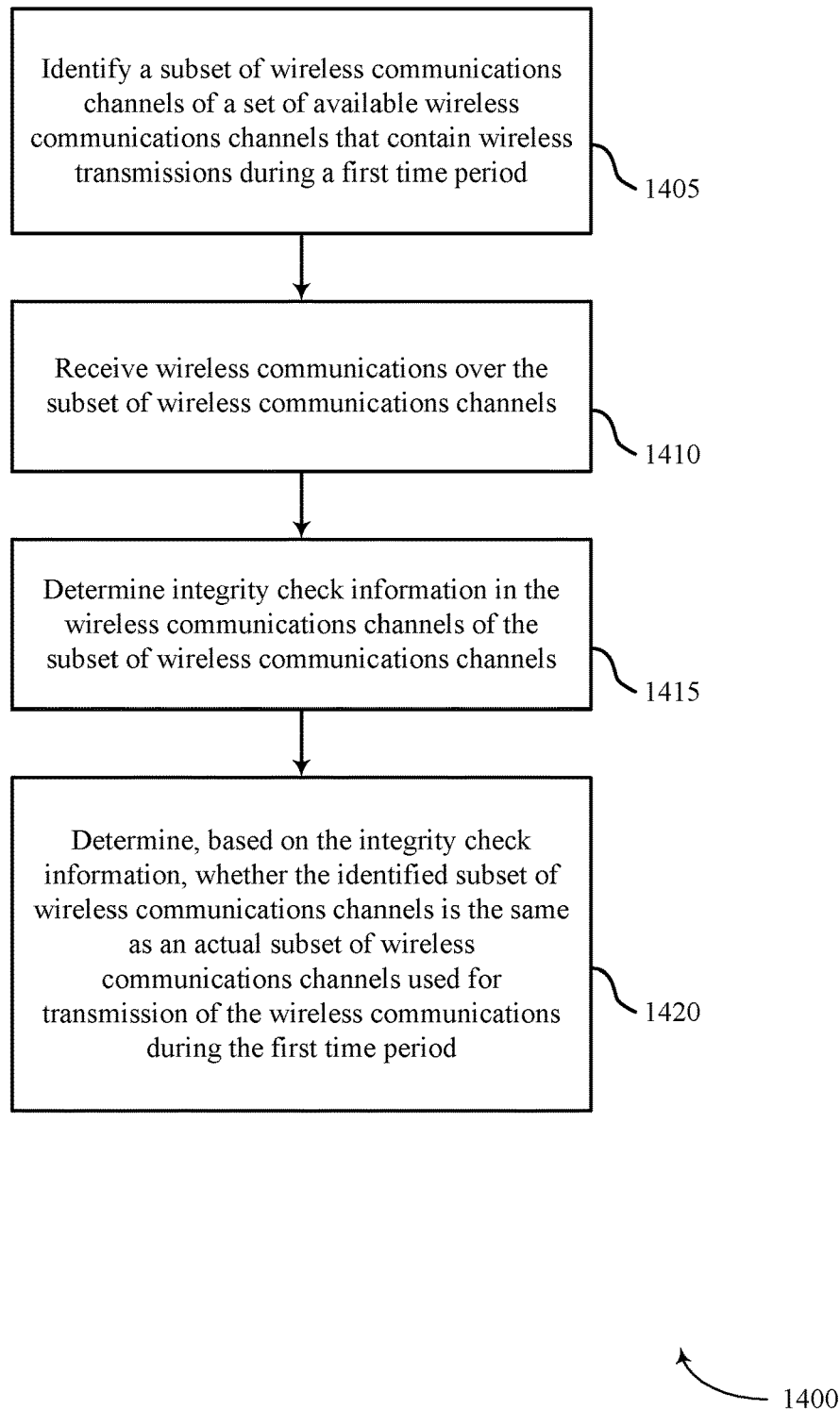

FIG. 14 shows a flowchart illustrating a method 1400 for an integrity check channel for reliable multi-channel activity detection in accordance with various aspects of the present disclosure. The operations of method 1400 may be implemented by a UE or base station or its components as described with reference to FIGS. 1, 2, 6, 10, and 11. For example, the operations of method 1400 may be performed by the integrity check module as described herein. In some examples, the UE or base station may execute a set of codes to control the functional elements of the device to perform the functions described below. Additionally or alternatively, the UE or base station may perform aspects the functions described below using special-purpose hardware.

At block 1405, the UE or base station may identify a subset of wireless communications channels of a set of available wireless communications channels that contain wireless transmissions during a first time period as described above with reference to FIGS. 2 through 6. In certain examples, the operations of block 1405 may be performed by the channel identification component as described with reference to FIGS. 8-9.

At block 1410, the UE or base station may receive wireless communications over the subset of wireless communications channels as described above with reference to FIGS. 2 through 6. In certain examples, the operations of block 1410 may be performed by the channel identification component as described with reference to FIGS. 8-9.

At block 1415, the UE or base station may determine integrity check information in the wireless communications channels of the subset of wireless communications channels as described above with reference to FIGS. 2 through 6. In certain examples, the operations of block 1415 may be performed by the integrity check information component as described with reference to FIGS. 8-9.

At block 1420, the UE or base station may determine, based on the integrity check information, whether the identified subset of wireless communications channels is the same as an actual subset of wireless communications channels used for transmission of the wireless communications during the first time period as described above with reference to FIGS. 2 through 6. In certain examples, the operations of block 1420 may be performed by the channel identification component as described with reference to FIGS. 8-9.

Figure 15:
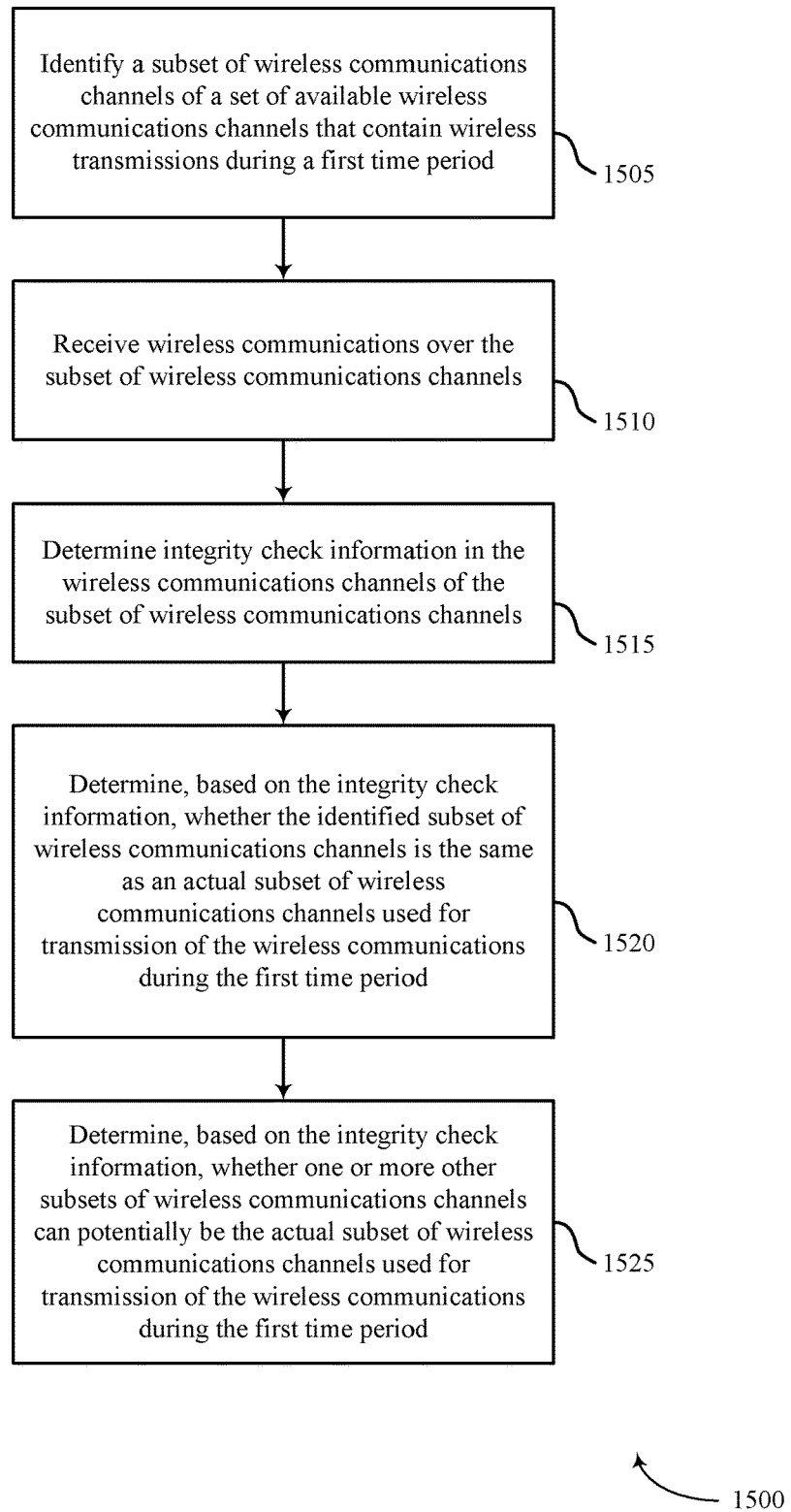

FIG. 15 shows a flowchart illustrating a method 1500 for an integrity check channel for reliable multi-channel activity detection in accordance with various aspects of the present disclosure. The operations of method 1500 may be implemented by a UE or base station or its components as described with reference to FIGS. 1, 2, 6, 10, and 11. For example, the operations of method 1500 may be performed by the integrity check module as described herein. In some examples, the UE or base station may execute a set of codes to control the functional elements of the device to perform the functions described below. Additionally or alternatively, the UE or base station may perform aspects the functions described below using special-purpose hardware.

At block 1505, the UE or base station may identify a subset of wireless communications channels of a set of available wireless communications channels that contain wireless transmissions during a first time period as described above with reference to FIGS. 2 through 6. In certain examples, the operations of block 1505 may be performed by the channel identification component as described with reference to FIGS. 8-9.

At block 1510, the UE or base station may receive wireless communications over the subset of wireless communications channels as described above with reference to FIGS. 2 through 6. In certain examples, the operations of block 1510 may be performed by the channel identification component as described with reference to FIGS. 8-9.

At block 1515, the UE or base station may determine integrity check information in the wireless communications channels of the subset of wireless communications channels as described above with reference to FIGS. 2 through 6. In certain examples, the operations of block 1515 may be performed by the integrity check information component as described with reference to FIGS. 8-9.

At block 1520, the UE or base station may determine, based on the integrity check information, whether the identified subset of wireless communications channels is the same as an actual subset of wireless communications channels used for transmission of the wireless communications during the first time period as described above with reference to FIGS. 2 through 6. In certain examples, the operations of block 1520 may be performed by the channel identification component as described with reference to FIGS. 8-9.

At block 1525, the UE or base station may determine, based on the integrity check information, whether one or more other subsets of wireless communications channels can potentially be the actual subset of wireless communications channels used for transmission of the wireless communications during the first time period as described above with reference to FIGS. 2 through 6. In certain examples, the operations of block 1525 may be performed by the channel identification component as described with reference to FIGS. 8-9.

Figure 16:
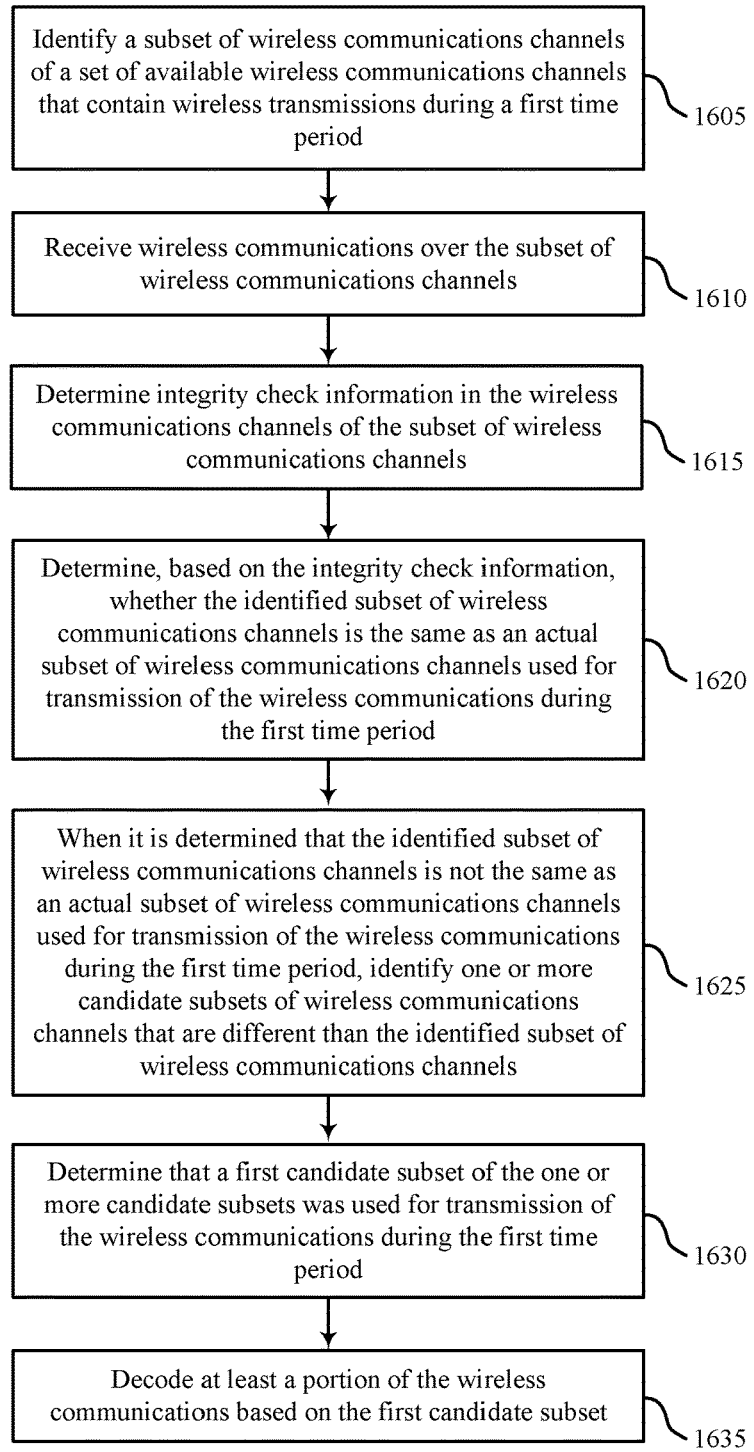

FIG. 16 shows a flowchart illustrating a method 1600 for an integrity check channel for reliable multi-channel activity detection in accordance with various aspects of the present disclosure. The operations of method 1600 may be implemented by a UE or base station or its components as described with reference to FIGS. 1, 2, 6, 10, and 11. For example, the operations of method 1600 may be performed by the integrity check module as described herein. In some examples, the UE or base station may execute a set of codes to control the functional elements of the device to perform the functions described below. Additionally or alternatively, the UE or base station may perform aspects the functions described below using special-purpose hardware.

At block 1605, the UE or base station may identify a subset of wireless communications channels of a set of available wireless communications channels that contain wireless transmissions during a first time period as described above with reference to FIGS. 2 through 6. In certain examples, the operations of block 1605 may be performed by the channel identification component as described with reference to FIGS. 8-9.

At block 1610, the UE or base station may receive wireless communications over the subset of wireless communications channels as described above with reference to FIGS. 2 through 6. In certain examples, the operations of block 1610 may be performed by the channel identification component as described with reference to FIGS. 8-9.

At block 1615, the UE or base station may determine integrity check information in the wireless communications channels of the subset of wireless communications channels as described above with reference to FIGS. 2 through 6. In certain examples, the operations of block 1615 may be performed by the integrity check information component as described with reference to FIGS. 8-9.

At block 1620, the UE or base station may determine, based on the integrity check information, whether the identified subset of wireless communications channels is the same as an actual subset of wireless communications channels used for transmission of the wireless communications during the first time period as described above with reference to FIGS. 2 through 6. In certain examples, the operations of block 1620 may be performed by the channel identification component as described with reference to FIGS. 8-9.

At block 1625, the UE or base station may, when it is determined that the identified subset of wireless communications channels is not the same as an actual subset of wireless communications channels used for transmission of the wireless communications during the first time period, identify one or more candidate subsets of wireless communications channels that are different than the identified subset of wireless communications channels as described above with reference to FIGS. 2 through 6. In certain examples, the operations of block 1625 may be performed by the channel identification component as described with reference to FIGS. 8-9.

At block 1630, the UE or base station may determine that a first candidate subset of the one or more candidate subsets was used for transmission of the wireless communications during the first time period as described above with reference to FIGS. 2 through 6. In certain examples, the operations of block 1630 may be performed by the channel identification component as described with reference to FIGS. 8-9.

At block 1635, the UE or base station may decode at least a portion of the wireless communications based on the first candidate subset as described above with reference to FIGS.

2 through 6. In certain examples, the operations of block 1635 may be performed by the decoder as described with reference to FIG. 9.

Figure 17:
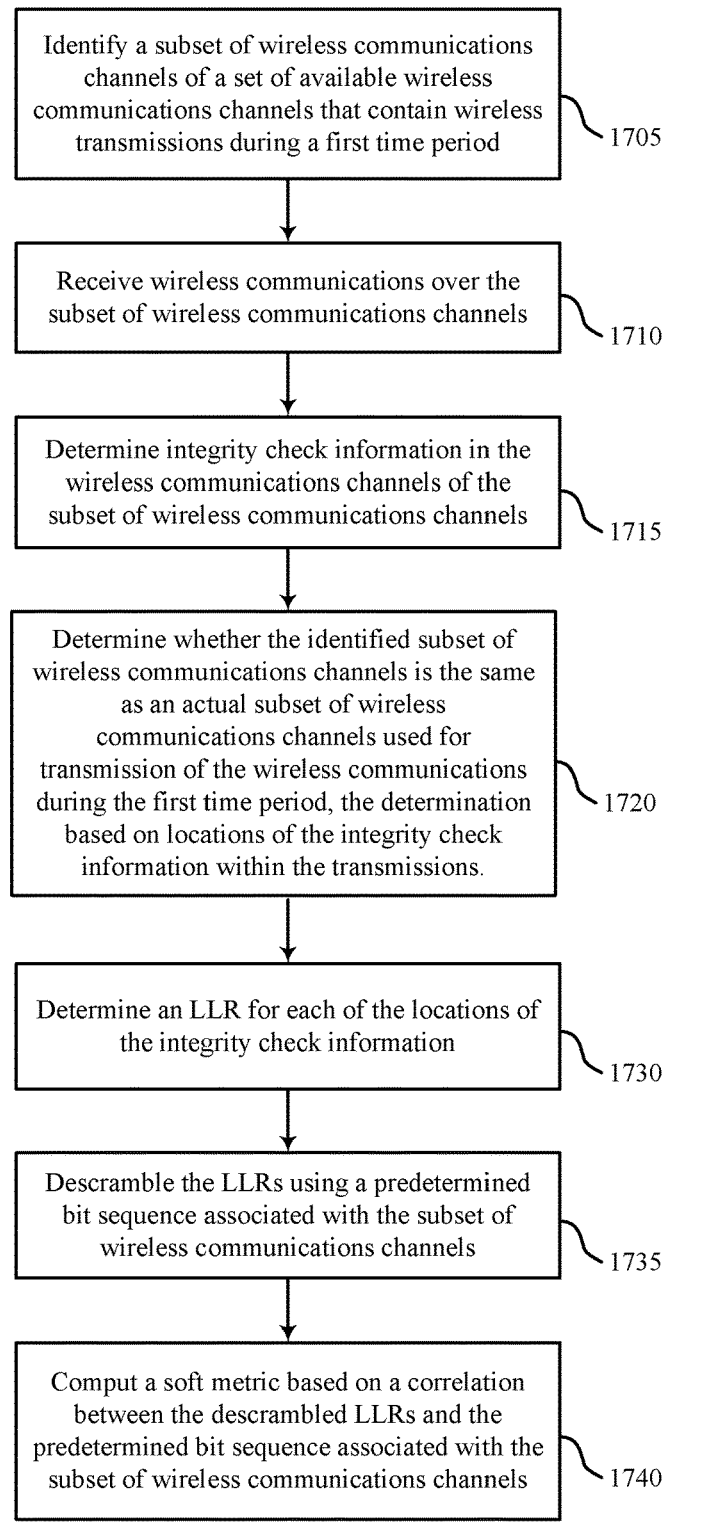

FIG. 17 shows a flowchart illustrating a method 1700 for an integrity check channel for reliable multi-channel activity detection in accordance with various aspects of the present disclosure. The operations of method 1700 may be implemented by a UE or base station or its components as described with reference to FIGS. 1, 2, 6, 10, and 11. For example, the operations of method 1700 may be performed by the integrity check module as described herein. In some examples, the UE or base station may execute a set of codes to control the functional elements of the device to perform the functions described below. Additionally or alternatively, the UE or base station may perform aspects the functions described below using special-purpose hardware.

At block 1705, the UE or base station may identify a subset of wireless communications channels of a set of available wireless communications channels that contain wireless transmissions during a first time period as described above with reference to FIGS. 2 through 6. In certain examples, the operations of block 1705 may be performed by the channel identification component as described with reference to FIGS. 8-9.

At block 1710, the UE or base station may receive wireless communications over the subset of wireless communications channels as described above with reference to FIGS. 2 through 6. In certain examples, the operations of block 1710 may be performed by the channel identification component as described with reference to FIGS. 8-9.

At block 1715, the UE or base station may determine integrity check information in the wireless communications channels of the subset of wireless communications channels as described above with reference to FIGS. 2 through 6. In certain examples, the operations of block 1715 may be performed by the integrity check information component as described with reference to FIGS. 8-9.

At block 1720, the UE or base station may determine, based on the integrity check information, whether the identified subset of wireless communications channels is the same as an actual subset of wireless communications channels used for transmission of the wireless communications during the first time period as described above with reference to FIGS. 2 through 6. In certain examples, the operations of block 1720 may be performed by the channel identification component as described with reference to FIGS. 8-9.

At block 1725, the UE or base station may determine locations of the integrity check information within the transmissions on each wireless communications channel of the subset of wireless communications channels based on which wireless communications channels of the set of available wireless communications channels are included in the subset of wireless communications channels as described above with reference to FIGS. 2 through 6. In certain examples, the operations of block 1725 may be performed by the channel identification component as described with reference to FIGS. 8-9.

At block 1730, the UE or base station may determine an LLR for each of the locations of the integrity check information as described above with reference to FIGS. 2 through 6. In certain examples, the operations of block 1730 may be performed by the energy level measuring component as described with reference to FIG. 9.

At block 1735, the UE or base station may descramble the LLRs using a predetermined bit sequence associated with the subset of wireless communications channels as described above with reference to FIGS. 2 through 6. In certain examples, the operations of block 1735 may be performed by the decoder as described with reference to FIG. 9.

At block 1740, the UE or base station may compute a soft metric based on a correlation between the descrambled LLRs and the predetermined bit sequence associated with the subset of wireless communications channels as described above with reference to FIGS. 2 through 6. In certain examples, the operations of block 1740 may be performed by the soft metric component as described with reference to FIG. 9.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for an integrity check channel for reliable multi-channel activity detection.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA (FDMA), OFDMA (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNB, Home NodeB, a Home eNodeB, or some other suitable terminology. The geographic coverage area for a base station may be divided into sectors making up only a portion of the coverage area. The wireless communications system or systems described herein may include base station of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for an integrity check channel for reliable multi-channel activity detection. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication comprising:
   identifying a set of two or more available wireless communications channels for transmitting wireless communications;
   identifying at least one wireless communications channel of the set of available wireless communications channels that is available for transmission of the wireless communications during a first time period;
   selecting integrity check information that indicates the identified at least one wireless communications channel available for transmission during the first time period; and
   transmitting the integrity check information and, concurrently, the wireless communications in the identified at least one wireless communications channel during the first time period.

2. The method of claim 1, further comprising:
   determining locations of the integrity check information within transmissions on each of the at least one wireless communications channel based at least in part on which wireless communications channels of the set of available wireless communications channels are used to transmit the wireless communications.

3. The method of claim 2, wherein the integrity check information comprises a known bit sequence uniformly hashed to resource elements (REs) at the determined locations.

4. The method of claim 1, further comprising:
   determining a scrambling sequence for the integrity check information based at least in part on which wireless communications channels of the set of available wireless communications channels are used to transmit the wireless communications.

5. The method of claim 1, wherein the integrity check information is transmitted after the reference signal (RS) in each of the at least one wireless communications channel of the set of available wireless communications channels that is available for transmission during the first time period.

6. The method of claim 1, wherein the integrity check information is transmitted using a layer one (L1) channel.

7. The method of claim 6, wherein the set of available wireless communications channels comprise wireless communications channels in a shared radio frequency spectrum band, and the identifying the wireless communications channels available for transmission during the first time period comprises:
   performing a listen-before-talk (LBT) procedure on each wireless communications channel of the set of available wireless communications channels to determine availability of each channel for transmissions during the first time period; and
   identifying, based at least in part on the LBT procedure, the at least one wireless communications channel as a channel of the set of available wireless communications channels that is available for transmissions based at least in part on the LBT procedure.

8. The method of claim 7, wherein the integrity check information comprises a user equipment (UE)-specific resource element (RE) quadrature phase shift keying (QPSK) sequence.

9. The method of claim 7, wherein the set of available wireless communications channels is received in an uplink (UL) grant from a base station.

10. A method of wireless communication comprising:
    identifying a subset of wireless communications channels of a set of available wireless communications channels that contain wireless transmissions during a first time period;
    receiving wireless communications and integrity check information concurrently over the subset of wireless communications channels during the first time period;
    analyzing integrity check information in the wireless communications channels of the subset of wireless communications channels; and
    determining, based at least in part on the analyzed integrity check information, whether the identified subset of wireless communications channels is the same as an actual subset of wireless communications channels used for transmission of the wireless communications during the first time period.

11. The method of claim 10, further comprising:
    determining, based at least in part on the integrity check information, whether one or more other subsets of wireless communications channels can potentially be the actual subset of wireless communications channels used for transmission of the wireless communications during the first time period.

12. The method of claim 10, wherein the identifying the subset of wireless communications channels comprises:
    receiving a reference signal (RS) on each of the wireless communications channels of the subset of wireless communications channels.

13. The method of claim 12, wherein the integrity check information is transmitted after the RS on each of the wireless communications channels of the subset of wireless communications channels.

14. The method of claim 10, wherein when it is determined that the identified subset of wireless communications channels is not the same as the actual subset of wireless communications channels used for transmission of the wireless communications during the first time period, the method further comprises:

identifying one or more candidate subsets of wireless communications channels that are different than the identified subset of wireless communications channels;

determining that a first candidate subset of the one or more candidate subsets was used for transmission of the wireless communications during the first time period; and decoding at least a portion of the wireless communications based on the first candidate subset.

15. The method of claim 14, wherein the identifying one or more candidate subsets comprises:

determining that another transmitter is transmitting using a first wireless communications channel of the set of available wireless communications channels; and identifying a first candidate subset that includes the subset of wireless communications channels and the first wireless communications channel.

16. The method of claim 14, wherein the identifying the subset of wireless communications channels comprises;

measuring an energy level of each wireless communication channel of the set of wireless communications channels; and identifying the subset of wireless communications channels as each channel of the set of wireless communications channels having the measured energy level that exceeds a threshold.

17. The method of claim 16, wherein the identifying one or more candidate subsets comprises:

determining that the measured energy level for a first wireless communications channel of the set of available wireless communications channels is within a predefined range from the threshold; and identifying a first candidate subset that includes the subset of wireless communications channels and the first wireless communications channel.

18. The method of claim 14, further comprising:

receiving a reference signal (RS) on each of the wireless communications channels of the subset of wireless communications channels, wherein the first candidate subset is determined based at least in part on the RS.

19. The method of claim 10, wherein the determining comprises:

determining locations of the integrity check information within the transmissions on each wireless communications channel of the subset of wireless communications channels based at least in part on which wireless communications channels of the set of available wireless communications channels are included in the subset of wireless communications channels;

determining a log-likelihood ratio (LLR) for each of the determined locations of the integrity check information;

descrambling the LLRs using a bit sequence associated with the subset of wireless communications channels; and computing a soft metric based at least in part on a correlation between the descrambled LLRs and the bit sequence associated with the subset of wireless communications channels.

20. The method of claim 19, further comprising:

determining that another subset of the set of available wireless communications channels other than the identified subset may potentially be used for transmission of the wireless communications during the first time period when the soft metric is below a threshold; and determining that the identified subset of wireless communications channels were actually used for transmission of the wireless communications during the first time period when the soft metric is above the threshold.

21. The method of claim 19, wherein the integrity check information comprises the bit sequence uniformly hashed to REs at the determined locations, and wherein the determined locations are determined based at least in part on which wireless communications channels of the set of available wireless communications channels are used to transmit the wireless communications.

22. The method of claim 19, wherein the bit sequence of the integrity check information is identified based at least in part on which wireless communications channels of the set of available wireless communications channels are used to transmit the wireless communications.

23. The method of claim 10, wherein the integrity check information is transmitted using a layer one (L1) channel.

24. The method of claim 23, wherein the L1 channel is a PHY frame format indicator channel (PFFICH).

25. The method of claim 23, wherein the integrity check information comprises a user equipment (UE)-specific resource element (RE) QPSK sequence.

26. An apparatus for wireless communication, comprising:

a processor;

memory in electronic communication with the processor; and instructions stored in the memory and operable, when executed by the processor, to cause the apparatus to:

identify a set of two or more available wireless communications channels for transmitting wireless communications;

identify at least one wireless communications channel of the set of available wireless communications channels that is available for transmission of the wireless communications during a first time period;

select integrity check information that indicates the identified at least one wireless communications channel available for transmission during the first time period; and transmit the integrity check information and, concurrently, the wireless communications in the identified at least one wireless communications channel during the first time period.

27. The apparatus of claim 26, wherein the instructions are operable to cause the processor to:

determine locations of the integrity check information within transmissions on each of the at least one wireless communications channel based at least in part on which wireless communications channels of the set of available wireless communications channels are used to transmit the wireless communications.

28. The apparatus of claim 26, wherein a bit pattern of the integrity check information is determined based at least in part on which wireless communications channels of the set of available wireless communications channels are used to transmit the wireless communications.

29. An apparatus for wireless communication, comprising:

a processor;

memory in electronic communication with the processor; and instructions stored in the memory and operable, when executed by the processor, to cause the apparatus to:

identify a subset of wireless communications channels of a set of available wireless communications channels that contain wireless transmissions during a first time period;

receive wireless communications and integrity check information concurrently over the subset of wireless communications channels during the first time period;

analyze integrity check information in the wireless communications channels of the subset of wireless communications channels; and determine, based at least in part on the analyzed integrity check information, whether the identified subset of wireless communications channels is the same as an actual subset of wireless communications channels used for transmission of the wireless communications during the first time period.

30. The apparatus of claim 29, wherein when it is determined that the identified subset of wireless communications channels is not the same as the actual subset of wireless communications channels used for transmission of the wireless communications during the first time period, the instructions are operable to cause the processor to:

identify one or more candidate subsets of wireless communications channels that are different than the identified subset of wireless communications channels;

determine that a first candidate subset of the one or more candidate subsets was used for transmission of the wireless communications during the first time period; and decode at least a portion of the wireless communications based on the first candidate subset.

* * * * *